United States Patent
Mehr et al.

(10) Patent No.: US 12,454,349 B2
(45) Date of Patent: Oct. 28, 2025

(54) HIGH TEMPERATURE BRAZING OF METALS AND CERAMICS TO CARBON SUBSTRATES

(71) Applicant: Honeywell International Inc., Charlotte, NC (US)

(72) Inventors: Mehrad Mehr, Raleigh, NC (US); Bahram Jadidian, Watchung, NJ (US); Neil Murdie, Granger, IN (US)

(73) Assignee: Honeywell International Inc., Charlotte, NC (US)

( * ) Notice: Subject to any disclaimer, the term of this patent is extended or adjusted under 35 U.S.C. 154(b) by 358 days.

(21) Appl. No.: 18/050,831

(22) Filed: Oct. 28, 2022

(65) Prior Publication Data

US 2024/0140595 A1    May 2, 2024

(51) Int. Cl.
| | |
|---|---|
| *F16D 65/12* | (2006.01) |
| *B23K 1/00* | (2006.01) |
| *B23K 35/32* | (2006.01) |
| *B64C 25/42* | (2006.01) |
| *F16D 69/02* | (2006.01) |

(Continued)

(52) U.S. Cl.
CPC ............ *B64C 25/42* (2013.01); *B23K 1/0008* (2013.01); *B23K 35/322* (2013.01); *F16D 65/126* (2013.01); *F16D 69/023* (2013.01); *B23K 2101/006* (2018.08); *B23K 2103/18* (2018.08); *F16D 2065/1364* (2013.01);
(Continued)

(58) Field of Classification Search
CPC ...... F16D 65/12; F16D 65/123; F16D 65/126; F16D 69/023; F16D 2065/1364; F16D 2065/1372; F16D 2065/1392; B64C 25/42

USPC .......................................... 188/71.5, 218 XL
See application file for complete search history.

(56) References Cited

U.S. PATENT DOCUMENTS

| | | |
|---|---|---|
| 3,376,960 A | 4/1968 | Bender |
| 3,813,759 A | 6/1974 | Heap et al. |
| (Continued) | | |

FOREIGN PATENT DOCUMENTS

| | | | | |
|---|---|---|---|---|
| CA | 936109 A | | 10/1973 | |
| CN | 105526284 A | * | 4/2016 | ............. F16D 65/12 |
| (Continued) | | | | |

OTHER PUBLICATIONS

Casalegno et al., "Surface modification 1-15 of carbon/carbon composites to improve their wettability by copper", Carbon, vol. 50, No. 6, Elsevier, Oxford, GB, Jan. 13, 2012, pp. 2296-2306.
(Continued)

*Primary Examiner* — Thomas J Williams
(74) *Attorney, Agent, or Firm* — Shumaker & Sieffert, P.A.

(57) ABSTRACT

An apparatus includes a first component comprising a carbon composite substrate. A high temperature coating is disposed on the surface of the carbon composite substrate. The high temperature coating includes a bond layer of a metal carbide on the surface of the substrate. The apparatus includes a second component, and braze material joining the surface of the first component to the second component. In some examples, a brake assembly may include a rotor having a surface configured to interface with another component of the brake assembly. The brake assembly includes an insert joined to the surface of the rotor without a mechanical fastener, and the insert defines a tough mechanical contact surface configured to protect the rotor.

15 Claims, 12 Drawing Sheets

(51) Int. Cl.
    *B23K 101/00*     (2006.01)
    *B23K 103/18*     (2006.01)
    *F16D 65/02*      (2006.01)

(52) U.S. Cl.
    CPC ............... *F16D 2065/1372* (2013.01); *F16D 2065/1392* (2013.01); *F16D 2250/0076* (2013.01)

(56) References Cited

U.S. PATENT DOCUMENTS

| | | | |
|---|---|---|---|
| 3,907,076 A * | 9/1975 | Crossman | F16D 65/126 |
| | | | 188/218 XL |
| 4,858,817 A | 8/1989 | Hwang et al. | |
| 5,904,287 A | 5/1999 | Tashiro et al. | |
| 6,193,027 B1 * | 2/2001 | Krenkel | F16D 65/126 |
| | | | 188/218 XL |
| 7,318,547 B2 | 1/2008 | Gasse | |
| 9,713,860 B2 | 7/2017 | Chaumat et al. | |
| 10,807,912 B1 | 10/2020 | Zhu et al. | |
| 2003/0021901 A1 | 1/2003 | Gasse | |
| 2007/0193836 A1 * | 8/2007 | Walker | F16D 65/126 |
| | | | 188/218 XL |
| 2013/0180812 A1 | 7/2013 | Brown et al. | |
| 2016/0102576 A1 | 4/2016 | Xu et al. | |
| 2019/0048949 A1 * | 2/2019 | Stevenson | F16D 65/123 |
| 2019/0093498 A1 | 3/2019 | Gong et al. | |
| 2021/0222745 A1 * | 7/2021 | Spray | F16D 55/36 |
| 2021/0261474 A1 | 8/2021 | Jadidian et al. | |
| 2021/0332865 A1 | 10/2021 | Lindner et al. | |
| 2024/0140595 A1 * | 5/2024 | Mehr | B64C 25/42 |
| 2024/0343653 A1 | 10/2024 | Hinoki et al. | |

FOREIGN PATENT DOCUMENTS

| | | | | |
|---|---|---|---|---|
| CN | 106588064 A | | 4/2017 | |
| CN | 107244944 A | | 10/2017 | |
| EP | 2157330 A1 | * | 2/2010 | ........... F16D 65/125 |
| FR | 1288799 A | * | 3/1962 | ........... F16D 65/123 |

OTHER PUBLICATIONS

Extended Search Report from counterpart European Application No. 23201987.7 dated Apr. 3, 2024, 8 pp.

He et al., "Interfacial reaction and brazing behaviour of SiCf/SiC with Cf/C composites using Si-10Zr alloy at high temperatures", Journal of the European Ceramic Society, vol. 41, No. 2, Elsevier, Amsterdam, NL, Sep. 28, 2020, pp. 1142-1150.

Li et al., "A review on filler materials for brazing of carbon-carbon composites", Reviews on Advanced Materials Science, vol. 60, No. 1, Jan. 1, 2021, Pages Whole Doc.—in particular Table 6.

Moutis et al., "Brazing of carbon-carbon composites to Nimonic alloys", Journal of Material Science, vol. 45, No. 1, Kluwer Academic Publishers, Dordrecht, Sep. 30, 2009, 8 pp.

Response to Extended Search Report dated Apr. 3, 2024, from counterpart European Application No. 23201987.7 filed Aug. 8, 2024, 8 pp.

Allair USA, Brazing Applications Above 1 000C, Dec. 21, 2019, 5 pp.

Communication pursuant to Article 94(3) EPC from counterpart European Application No. 23201987.7 dated Sep. 18, 2025, 4 pp.

* cited by examiner

HIGH TEMPERATURE BRAZING OF METALS AND CERAMICS TO CARBON SUBSTRATES

TECHNICAL FIELD

The disclosure relates to components joined by a braze material.

BACKGROUND

Carbon composite substrates may be used in high temperature applications. For example, the aerospace industry employs carbon composite components as friction materials for commercial and military aircraft, such as brake assembly friction materials. In high temperature applications, carbon composites may be susceptible to impact by other components of an assembly, which may lead to deterioration of physio-mechanical properties.

SUMMARY

In general, the disclosure describes methods for joining components to carbon composites (e.g., carbon/carbon (C/C) composites) using a high temperature braze material. A surface portion of a carbon composite may be converted by infiltration with a metal to form a bond layer which includes metal carbide at a surface of the carbon composite. The braze material may form a stronger bond with the bond layer which includes metal carbide layer than the surface portion of the carbon composite, while the metal carbide layer may be more resistant to delamination than a metal carbide layer formed on, rather than from, the surface portion of the carbon composite, such as through deposition techniques. In this way, components may be bonded to carbon composites using relatively low temperature brazing techniques. As a result, portions of components based primarily on carbon composites that were previously intended for functional applications, such as contact surfaces, may be replaced with components, such as contact inserts, more suitable for particular functions than carbon composites.

In some examples, the disclosure is directed to an article which includes a first component. The first component includes a substrate comprising a carbon matrix and a high temperature coating on a surface of the substrate. The high temperature coating comprises a bond layer of a metal carbide on the surface of the substrate. The article includes a second component, and a braze material joining a surface of the high temperature coating of the first component to a surface of the second component.

In some examples, the disclosure is directed to a technique which includes forming a high temperature coating on a surface of a substrate of a first component. The first component includes a substrate including a carbon matrix and a high temperature coating on a surface of the substrate. The high temperature coating includes a bond layer of a metal carbide on the surface of the substrate. The technique includes joining a surface of the second component to a surface of the high temperature coating of the first component by brazing with a braze material.

In some examples, the disclosure is directed to a brake assembly. The brake assembly includes a rotor having a surface configured to interface with another component of the brake assembly. The brake assembly includes an insert joined to the surface of the rotor without a mechanical fastener, wherein the insert defines a tough mechanical contact surface configured to protect the rotor.

In some examples, the disclosure is directed to a technique for manufacturing a brake assembly. The technique includes positioning an insert on a surface of a rotor. The surface of the rotor interfaces with another component of the brake assembly. The technique also includes joining the insert to the surface of the rotor without a mechanical fastener. The insert defines a tough mechanical contact surface configured to protect the rotor during operation of the brake assembly.

The details of one or more examples are set forth in the accompanying drawings and the description below, where like symbols indicate like elements. Other features, objects, and advantages will be apparent from the description and drawings, and from the claims.

DETAILED DESCRIPTION

Figure 1:
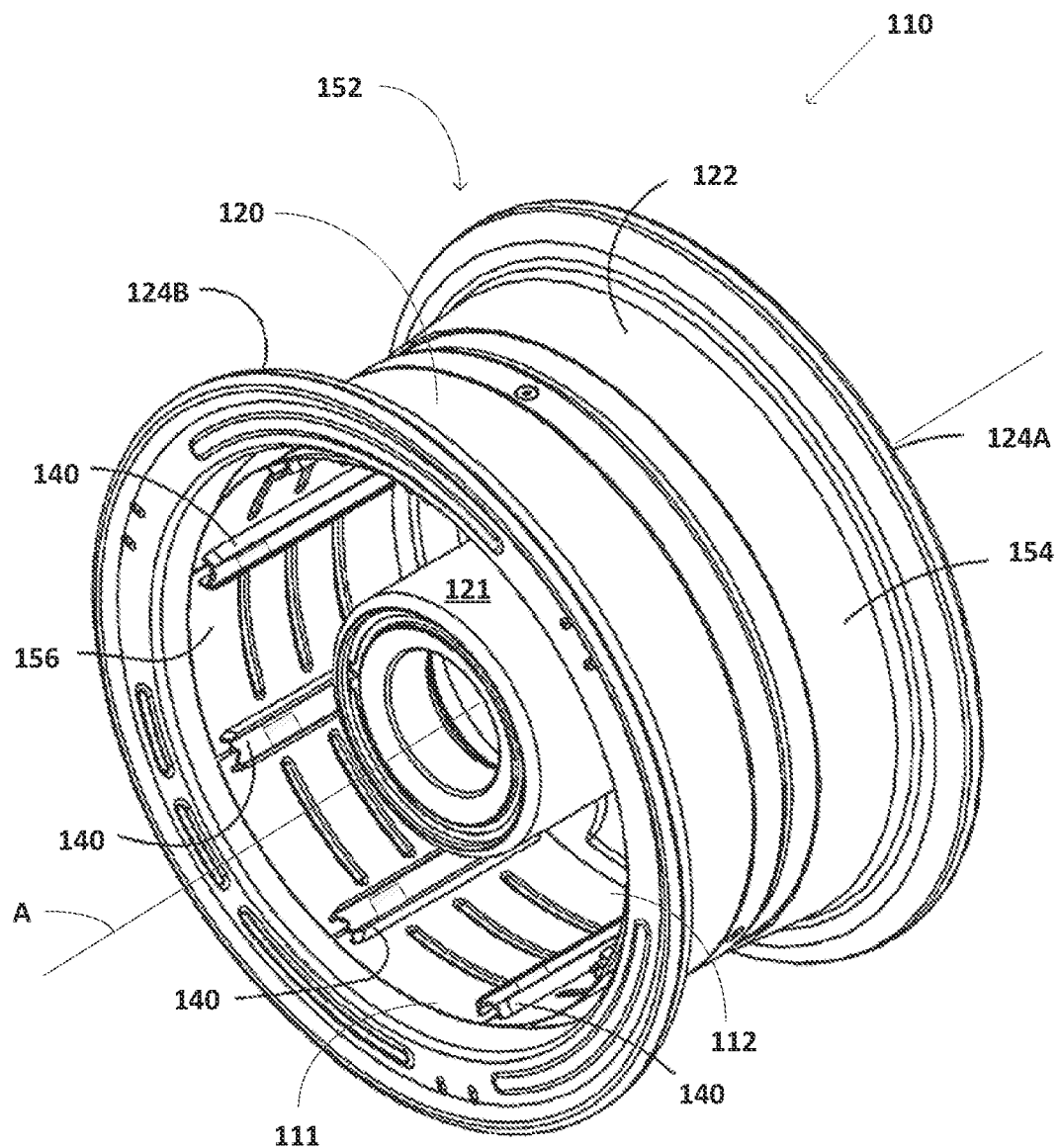
FIG. 1 is a perspective view illustrating an example wheel including a brake assembly which includes an insert brazed to a rotor, according to examples of the disclosure.

The disclosure describes articles that include a first component having a carbon composite substrate that is joined to a second component by braze material. The first component includes a high temperature coating on the surface of the substrate, and the high temperature coating includes a bond layer of a metal carbide. The bond layer provides a bonding surface with which the braze material may form a bond. Articles which include a first component including a carbon composite substrate and a bond layer made from a metal carbide may be especially suitable for ultra-high temperature (e.g., greater than 1500 degrees Celsius (° C.)) applications.

Carbon composite components may provide good mechanical properties and have low mass density relative to other materials, such as metal alloys. However, carbon composite components may not be readily joined to other components because braze material may not "stick," or form a durable and robust bond, with the surface of a carbon composite component. Accordingly, joining a carbon composite component to a second component often includes one or more mechanical fasteners such as rivets, nuts and bolts, screws, or the like. In some applications, such as examples where a carbon composite rotor of a brake assembly is joined to an insert configured to protect the rotor, joining the components by one or more mechanical fasteners may be undesirable.

Carbon composite substrates which include a high-temperature coating, including a bond layer of a metal carbide, may provide for joining components without mechanical fasteners, such as by brazing with a braze material. Components joined without mechanical fasteners (e.g., rivets, pins, or the like) may distribute stresses (e.g., due to vibration of a brake assembly) across a bonded surface. Stated similarly, components joined without mechanical fasteners may create a static contact between components that minimizes damages related to relative motion between the components. Such stable joining of components may permit functional components, which may have properties more suitable to a particular application than a carbon composite substrate, to be securely bonded to various portions of the component based on a carbon composite substrate. Furthermore, components joined without mechanical fasteners, such as by braze material bonded to a metal carbide-based high temperature coating may provide other advantages, such as improved resistance to oxidation and/or environmental attack at high temperatures experienced in aerospace applications, such as aircraft brakes (e.g., temperatures exceeding 1000° C.), and hypersonic applications, such as leading edges and rocket nozzles.

Prior to use in an oxidizing atmosphere, a metal carbide-based high temperature coating may be formed at an external surface of a component made from a high temperature carbon composite substrate. The metal carbide-based high temperature coating may reduce oxidation of the external surface of the substrate and prepare a surface of the component for bonding to a braze material. In some examples, a surface portion of a carbon composite substrate may be converted to a metal carbide layer, as will be further described below, to form a dense metal carbide layer resistant to delamination and cracking. The resulting bond layer may be suitable for joining to another component by brazing because the brazing properties of the first component may be improved, such as reduction of the surface energy of the surface and improved wetting of the braze material.

Bonding components using a braze material which may survive high temperatures exceeding 1000° C. may be performed using any suitable braze material. In some examples, the braze material may include a platinum group metal such as platinum, rhodium, or the like. In some examples, braze material may be applied to the antioxidant metal carbide layer by one or more of application of a tape, foil, preform, paint, sputter, or the like.

Brazed articles, components and assemblies described herein may be used in a variety of high temperature applications. Due to high temperatures experienced by components in high speed, friction, or combustion environments, the high temperature articles may be particularly suited to aerospace applications. FIGS. 1-4 are schematic diagrams illustrating various portions of example aircraft brake assemblies that include, or are configured to interface with, a composite rotor and an insert joined to the rotor by braze material, according to examples of the disclosure. For ease of description, examples of the disclosure will be described primarily with regard to aircraft brake assemblies. However, the articles of this disclosure may be used to form brake components other than aircraft brake rotors, and for applications other than brake components. As one example, the brake components may be used as friction materials in other types of braking applications and vehicles. As another example, the articles may be used for leading edges, hypersonic vehicles or weapons, rocket nozzles, and other application involving high temperatures and oxidizing environments.

FIG. 1 is a perspective view of an example wheel 110 including a plurality of rotor drive keys 140 on an interior surface 156 of wheel 110. In some examples, wheel 110 is a part of an aircraft vehicle. In other examples, wheel 110 may be a part of any other vehicle, such as, for example, any marine vessel, land vehicle, or other vehicle.

Wheel 110 may include a rim 152 defining an exterior surface 154 and interior surface 156. Rim 152 may include tubewell 120, wheel hub 121, and outboard tubewell 122. In some examples, interior surface 156 may include an inner diameter of tubewell 120. For example, in some cases, interior surface 156 may be referred to as an inner diameter surface of wheel 110. In some examples, a tire (not shown) may be mounted on exterior surface 154 of rim 152. For example, wheel 110 may include an inboard bead seat 124B and an outboard bead seat 124A configured to retain a tire on exterior surface 154 of rim 152.

Wheel 110 is configured to engage with one or more rotors (not shown in FIG. 1) of a braking assembly. For example, as shown in the example of FIG. 1, a plurality of rotor drive keys 140 are attached to interior surface 156, and each rotor drive key of the plurality of rotor drive keys 140 may be configured to engage with one or more slots in one or more rotors of a brake disc stack of a braking assembly. During braking operations, vibrations may cause the plurality of rotor drive keys 140 of wheel 110 to move with respect to the respective slot in the rotors of the brake assembly. As such, the plurality of rotor drive keys 140 may exert repetitive rubbing forces on surfaces of the rotors. An insert configured to protect the rotor may be joined to a surface of the slot without a mechanical fastener, to protect a surface of the slot as it engages with the rotor and thus protect the rotor, as will be further described and illustrated below with respect to FIGS. 2-4. An example braking assembly will be described in more detail with respect to FIG. 2. Various properties of the insert, such as dimensions, may relate to various properties of rotor drive keys 140.

In some examples, each rotor drive key of the plurality of rotor drive keys 140 extends in a substantially axial direction of wheel 110 (e.g., in a direction parallel to the axis label "A" in FIG. 1, which can be an axis of rotation of wheel 110). For example, a length of each rotor drive key of the plurality of rotor drive keys 140 may extend in the substantially axial (e.g., axial or nearly axial to the extent permitted by manufacturing tolerances) direction of the axis A. In some such examples, the respective length of each rotor drive key 140 may extend from (or near) a first edge 111 of wheel 110 to (or close to) a second edge 112 of wheel 110. In this way, in some examples, a length of a rotor drive key 140 of the plurality of rotor drive keys 140 may be the same or substantially similar to (e.g., within 10%) a width of wheel 110 from the first edge to the second edge. In other examples, a length of a rotor drive key 140 may be less than the width of wheel 110.

The plurality of rotor drive keys 140 extending in the substantially axial direction may enable wheel 110 to slide onto a braking assembly. For example, a plurality of rotors of a braking assembly may include slots configured to receive the plurality of rotor drive keys 140, enabling the plurality of rotor drive keys 140 to be slid into respective slots of the plurality of rotors. In other examples, one or more rotor drive keys of the plurality of rotor drive keys 140 may be oriented in a different direction and/or may engage with one or more rotors in a different manner.

The plurality of rotor drive keys 140 may include any suitable number of rotor drive keys. The number of drive keys may be vehicle specific and may depend on, e.g., loads, size of parts, material properties, and the like. In some examples, the number of the rotor drive keys included in the plurality of rotor drive keys 140 may correspond to a number of slots defined by a plurality of rotors of a braking assembly configured to receive the plurality of rotor drive keys 140. For example, each rotor drive key of the plurality of rotor drive keys 140 may correspond to a respective slot defined by the plurality of rotors of a braking assembly.

As illustrated in the example of FIG. 1, in some examples, the plurality of rotor drive keys 140 may be mounted at substantially equal circumferential distances around interior surface 156 of wheel 110. In other examples, one or more of the plurality of rotor drive keys 140 may be mounted a different circumferential distance from an adjacent rotor drive than at least one other rotor drive key. Here and elsewhere, circumferential distance means the length of an arc on the interior surface 156 of wheel 110 where the arc is in a plane perpendicular to the substantially axial direction of wheel 110. Rotor drive keys 140 may be integrally formed with tubewell 120 or may be separate from and mechanically affixed to tubewell 120.

Figure 2:
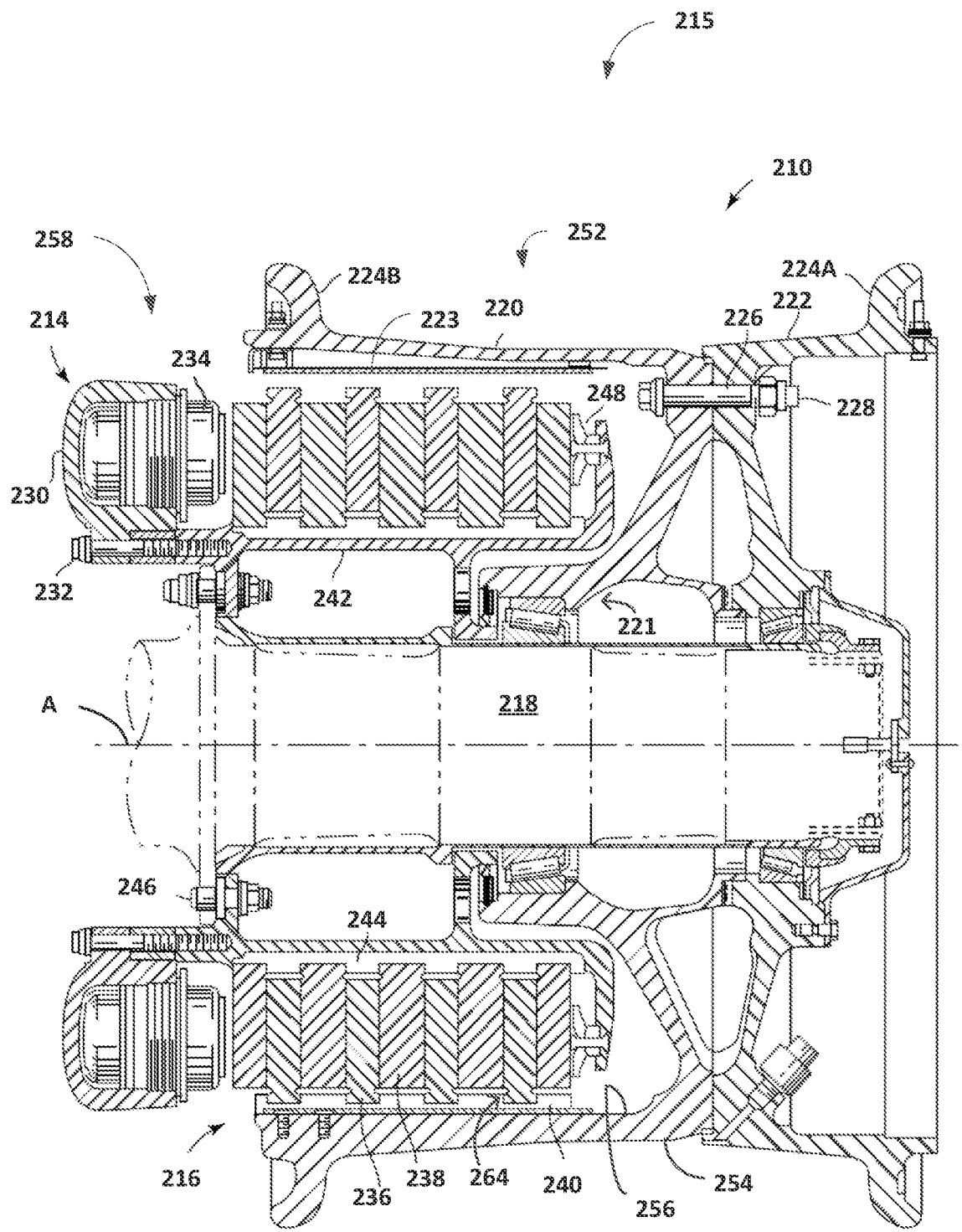
FIG. 2 is a schematic cross-sectional view of an example wheel and brake assembly, according to examples of the disclosure.

FIG. 2 is a schematic cross-sectional view of an example wheel and brake assembly 215 including a wheel 210 and a brake assembly 258. Wheel and brake assembly 215 is shown and described to provide context to the example brake assemblies including an insert joined with braze material as described herein. The rotors and inserts described herein, however, may be used with any suitable wheel and brake assembly in other examples, such as with wheel 110 of FIG. 1. Wheel and brake assembly 210 may include a brake assembly similar to brake assembly 110 of FIG. 1.

Wheel 210 includes tubewell 220, wheel hub 221, outboard tubewell 222, outboard bead seat 224A, and inboard bead seat 224B, rim 252, exterior surface 254, and interior surface 256, which may be configured individually and in relation to each other in the same manner as that discussed for the like-named components of wheel 110 (FIG. 1). Wheel 210 may be configured to be rotatably carried on axle 218. For example, wheel 210 may be rotatably carried on axle 218 by wheel hub 221. In turn, wheel 210 may impart motion to a vehicle including or mounted on the wheel and brake assembly 215. In the example shown in FIG. 2, tubewell 220 and outboard tubewell 222 are mechanically coupled by lug bolt 226 and lug nut 228. Other connection techniques may be used in other examples.

Braking assembly 258 includes an actuator assembly 214 and a brake stack 216. Actuator assembly 214 includes actuator housing 230, actuator housing bolt 232, and piston 234. Brake stack 216 includes a plurality of brake discs, which include interleaved rotor brake discs 236 and stator brake discs 238. Rotor brake discs 236 are configured to move relative to stator brake discs 238, e.g., rotationally about axis A and axially along axis A relative to stator brake discs 238. Rotor brake discs 236 engage with wheel 210, and in particular tubewell 220, by rotor drive keys 240. Stator brake discs 238 are mounted to torque tube 242 by splines 244. Wheel and brake assembly 215 may support any variety of private, commercial, or military aircraft or other type of vehicle.

Wheel and brake assembly 215 may be mounted to a vehicle via torque tube 242 and axle 218. In the example of FIG. 2, torque tube 242 is affixed to axle 218 by a plurality of bolts 246. Torque tube 242 supports actuator assembly 214 and stator brake discs 238. Axle 218 may be mounted on a strut of a landing gear (not shown) or other suitable component of the vehicle to connect wheel and braking assembly 215 to the vehicle.

During operation of the vehicle, braking may be necessary from time to time, such as during landing and taxiing procedures of an aircraft. Wheel and brake assembly 215 is configured to provide a braking function to the vehicle via actuator assembly 214 and brake stack 216. Actuator assembly 214 includes actuator housing 230 and piston 234. Actuator assembly 214 may include different types of actuators such as one or more of, e.g., an electrical-mechanical actuator, a hydraulic actuator, a pneumatic actuator, or the like. During operation, piston 234 may extend away from actuator housing 230 to axially compress brake stack 216 against compression region 248 for braking.

Rotor brake discs 236 are slidably engaged with rotor drive keys 240 for common rotation with tubewell 220 and rotor drive keys 240. Stator brake discs 238 are mounted to torque tube 242 by splines 244. In the example of FIG. 2, brake stack 216 includes four rotors and five stators. However, a different number of rotors and/or stators may be included in brake stack 216 in other examples.

Rotor brake discs 236 and stator brake discs 238 may provide opposing friction surfaces for braking an aircraft. The carbon composite brake discs may define carbon composite surfaces at the interfaces between rotors 236 and stators 238, which may provide the high temperature performance required for the application. In some examples, wheel and brake assembly 215 may include a heat shield 223 between rotor brake discs 236 and tubewell 220 in order to, for example, limit thermal transfer between brake stack 216 and wheel 210.

In some examples, splines 244 may be circumferentially spaced about an outer portion of torque tube 242. Stator brake discs 238 may include a plurality of radially inwardly disposed lug notches along an inner diameter of the brake disc configured to engage with splines 244. Similarly, rotor brake discs 236 may include a plurality of radially inwardly disposed slots 264 (only one slot is labeled for clarity) along an outer periphery (e.g., an outer diameter in the case of a disc having a circular cross-section) of the rotor brake disc. Slots 264 may be configured to engage with rotor drive keys 240 to permit transfer of torque between rotor brake disc 236 and wheel 210 and permit removal of rotor brake disc 236 from wheel 210. As such, rotor brake discs 236 will rotate with the motion of wheel 210 while stator brake discs 238 remain stationary, allowing the friction surfaces of an adjacent stator brake disc 238 and rotor brake disc 236 to engage with one another to decelerate the rotation of wheel 210. Such friction engagement between stator brake disc 238 and rotor brake disc 236 may cause vibrations between the slots of rotor brake disc 236 and the corresponding rotor drive keys 240 of wheel 210. While the carbon composite substrate of rotor brake disc 236 may provide high temperature operation and adequate mechanical strength, such carbon composite substrate may not be particularly suited to contact forces from rotor drive keys 240.

In some examples, one or more surfaces defined by a slot may be protected from contact forces from rotor drive keys 240 by joining an insert to the surface(s). The insert may protect the carbon composite rotors during interaction with rotor drive keys 240 by providing a tough mechanical surface that contacts the rotor drive keys 240. As will be described further in FIG. 3 below, the insert may be secured to a rotor brake disc, such as rotor brake disc 236, with a robust bond using a brazing material.

Figure 3:
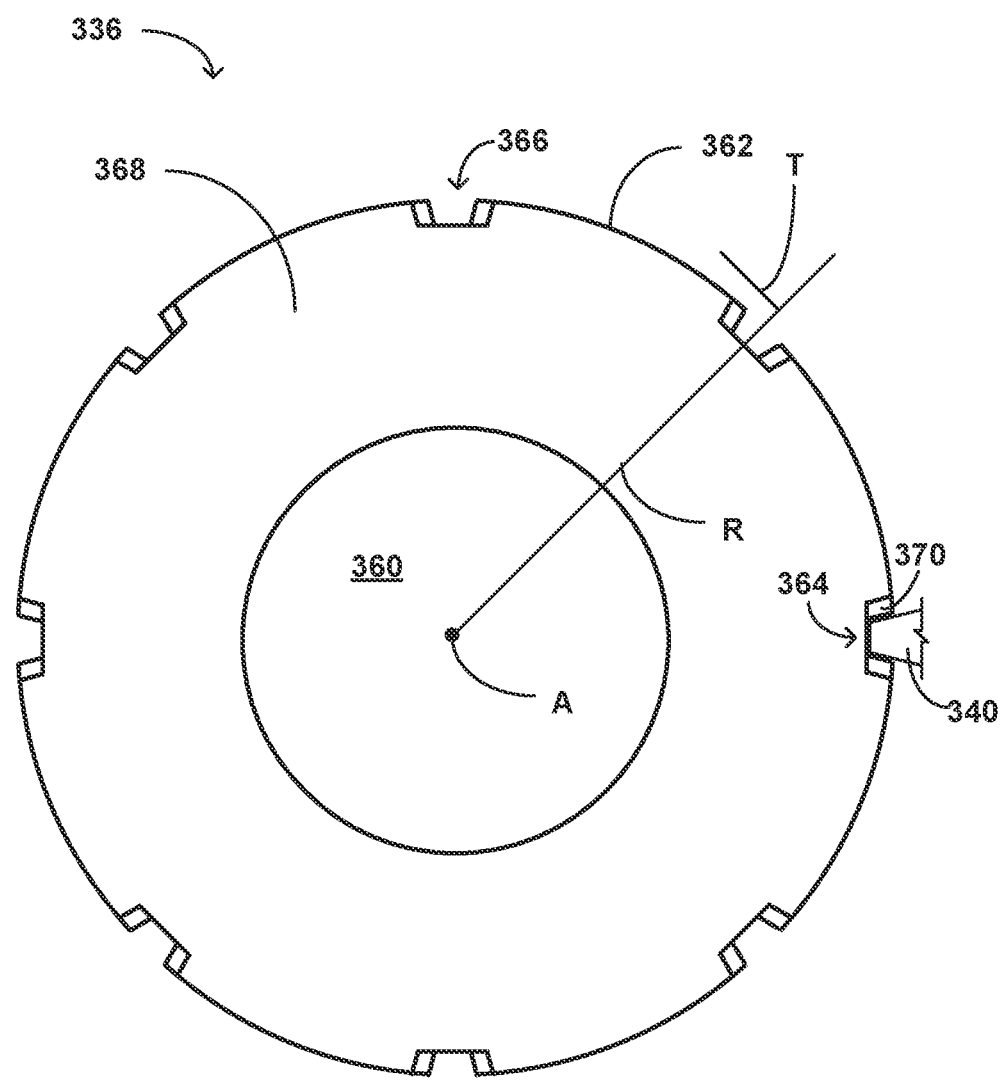
FIG. 3 is a plan view illustrating an example rotor brake disc, according to examples of the disclosure.

FIG. 3 is a diagram illustrating an example rotor brake disc 336, which is an example of one or more of rotor brake discs 236 (FIG. 2). Rotor brake disc 336 can be formed from any suitable material that includes a bulk carbon matrix, such as, but not limited to, a carbon substrate or a composite that includes a carbon substrate ("carbon composite substrate"). In some examples, the carbon composite substrate may include a carbon/carbon (C/C) composite. Additionally, or alternatively, rotor brake disc 336 may include a substantially pure carbon (e.g., graphite).

Rotor brake disc 336 defines a central aperture 360 extending through rotor brake disc 336. Rotor brake disc 336 further defines a plurality of slots around an outer perimeter 362 of rotor brake disc 336. The plurality of slots comprises, for example, slot 364 and slot 366, as well as others similarly depicted. Rotor brake disc 336 further includes friction surface 368. Rotor brake disc 336 may include a second friction surface (not shown) opposite friction surface 368. Friction surface 368 and the second friction surface of brake disc 336 are configured to engage with adjacent stator discs during a braking operation of a brake assembly including a brake disc stack, of which rotor brake disc 336 is part.

Central aperture 360 may be configured to surround an axle such as axle 218 and allow rotation of rotor brake disc 336 around and relative to the axle (FIG. 2). For example, central aperture 360 may be configured to receive torque tube 242, surrounding and affixed to axle 218 by bolts 246. The plurality of slots such as 364, 366 may be configured to slidably engage a plurality of rotor drive keys, such as the plurality of rotor drive keys 140, 240 (FIGS. 1 and 2). As discussed, each rotor drive key of the plurality of rotor drive keys 140, 240 may extend in a substantially axial direction of wheel 110, 210 (e.g., parallel to axis of rotation A shown in FIG. 3) and may be mounted around interior surface 156, 256 of wheel 110, 210 (FIG. 1, 2). When the plurality of slots slidably engages a plurality of rotor drive keys, such as plurality of rotor drive keys 140, 240, and central aperture 360 surrounds an axle such as axle 218, rotor brake disc 336 is configured to receive a force from the plurality of rotor drive keys which acts tangentially on rotor disc 336 and generates substantially synchronous rotation of rotor disc 336 with a wheel such as wheel 110, 210 (FIG. 1, 2).

FIG. 3 illustrates a portion of a rotor drive key 340 extending through slot 364. Rotor drive key 340 may be a rotor drive key of the plurality of rotor drive keys 140, 240 (FIGS. 1 and 2). Slot 364 is configured to slidably engage rotor drive key 340 in an axial direction of rotor brake disc 336. One or more of the slots (e.g., a subset of the slots or all of the slots) defined by rotor brake disc 336 may have a portion of a respective rotor drive key extending through the slot in a manner similar to that depicted for slot 364 and rotor drive key 340. Rotor drive key 340 may extend in a substantially axial direction A of a wheel such as wheel 110, 210 (FIGS. 1 and 2) and be mounted around an interior surface such as interior surface 156, 256 of wheel 110, 210, such that when the wheel rotates around an axle, such as axle 218, rotor drive key 340 correspondingly rotates around the axle. The rotation of rotor drive key 340 causes rotor drive key 340 to impart a force acting tangentially on rotor brake disc 336, generating substantially synchronous rotation of rotor disc 336 with the wheel.

During a braking operation, as wheel 210 rotates relative to axle 218, when a ram such as piston 234 compresses brake stack 216 (FIG. 2), rotor brake disc 336 of brake stack 216 may slidably translate over a plurality of rotor drive keys 140, 240 in an axial direction substantially parallel (e.g., parallel or nearly parallel to the extent permitted by manufacturing tolerances) to the axis A extending through central aperture 360. The axial translation of rotor brake disc 336 may bring friction surface 368 of rotor brake disc 336 into contact with a friction surface of one or more adjacent stator brake discs. As discussed, stator brake discs such as stator brake discs 238 may be mounted to torque tube 242 by splines 244 (FIG. 2), and may be rotationally stationary with respect to axle 218. Consequently, when rotor brake disc 336 is rotating with respect to an axle such as axle 218 (e.g., wheel 210 is turning) and rotor brake disc 336 is axially translated such that friction surface 368 contacts the friction surface of an adjacent stator brake disc, the plurality of rotor drive keys 140, 240 may impart a force on the plurality of slots such as slots 364, 366 as the frictional contact converts kinetic energy to thermal energy. For example, during the braking operation, the plurality of rotor drive keys 140, 240 may impart a force on the plurality of slots in a substantially tangential direction of rotor brake disc 336 as friction surface 368 engages a friction surface of an adjacent stator brake disc, when a wheel such as wheel 210 is experiencing rotation relative to an axle such as axle 218. The force imparted by the plurality of rotor drive keys such as drive key 340 on the plurality of slots such as slots 364, 366 may be an action force or a reaction force.

Here and elsewhere, an axial direction of a brake disc means the direction of a vector coincident with an axis extending through a central aperture of the rotor brake disc. For example, FIG. 3 illustrates an axis A perpendicular to the page and extending through central aperture 360. An axial direction of rotor brake disc 336 is the direction of a vector coincident with axis A. Axis A of FIG. 3 may correspond to axis A of FIG. 1 and/or FIG. 2. A radial direction of a brake disc means the direction of a vector coincident with a line perpendicular to and intersecting the axis extending through the central aperture, and intersecting the outer perimeter of the brake disc. For example, FIG. 3 illustrates a line R perpendicular to and intersecting axis A extending through central aperture 360, and intersecting outer perimeter 362 of rotor brake disc 336. A radial direction of rotor brake disc 336 is the direction of a vector coincident with line R. A tangential direction of a brake disc means the direction of a vector coincident with a line perpendicular to the axial direction of the brake disc and perpendicular to the radial direction of the brake disc. For example, FIG. 3 illustrates a line T perpendicular to axis A extending through central aperture 360 and perpendicular to line R. A tangential direction of rotor brake disc 336 is the direction of a vector coincident with line T.

Each of the plurality of slots, including slots 364, 366, in rotor brake disc 336 may be reinforced by an insert, such as first insert 370A and second insert 370B (collectively, "inserts 370") within slot 364. While inserts 370 and slot 364 are primarily referred to in the description of FIG. 3 as well as other figures, the description of inserts 370 and slot 364 may apply to the other slots and inserts of rotor brake disc 336 and other brake discs described herein. Additionally, while rotor brake disc 336 is primarily referred to in the description of FIG. 3 as well as other figures, the inserts described herein may also be utilized on a slot of a stator brake disc, such as one or more of stator brake discs 238 (FIG. 2). Furthermore, although illustrated and described as two inserts 370A and 370B within slot 364 in FIG. 3, in some examples a brake assembly may include a rotor brake disc 336 with a slot 364 that includes a single insert 370, or with more than two inserts 370, such as three inserts 370, four inserts 370, or the like.

Inserts 370 may be configured to help relieve the effect of stresses imparted to slot 364 from rotor drive key 340 during a braking operation by providing a tough mechanical surface to interface with rotor drive key 340. First insert 370A defines first insert surface 373, which is configured to provide a sliding and a bearing surface to act against rotor drive key 340, and, thus, may minimize or even eliminate the extent to which rotor drive key 340 engages directly with a surface of rotor brake disc 336. Likewise, second insert 370B defines second insert surface 375, which is configured to protect rotor slot 364 by defining a tough mechanical surface to interface with drive key 340. Inserts 370 are configured to substantially cover certain areas (e.g., all or part of a first surface, a second surface, and/or a third surface) of slot 364 and are configured to install on rotor brake disc 336 such that inserts 370 are disposed between rotor drive key 340 and slot 364 when rotor drive key 340 imparts tangential forces to slot 364 during braking operations. Thus, drive key 340 may be configured to interface directly with inserts 370 rather than rotor brake disc 336, and inserts 370 may define a tough mechanical surface which protects rotor brake disc 336. Inserts 370 are configured to provide for secure placement within slot 364 in the axial, radial, and tangential directions of rotor brake disc 336, in order to maintain a substantially fixed position relative to slot 364 as rotor brake disc 336 rotates during rotation of wheel 110, 210 (FIG. 1,2). Inserts 370 may be configured to provide secure placement in the absence of rivets or other mechanical fastening mechanisms penetrating rotor brake disc 336. The use of inserts 370 may reduce wear of slot 364 as rotor drive key 340 cyclically loads and slides against slot 364 over repeated braking operations. Attachment of inserts 370 to rotor brake disc 336 may be such that inserts 370 are joined to rotor brake disc 336 without a mechanical fastener or fasteners. Accordingly, inserts 370 may reduce or eliminate wear of rotor brake disc 336 that would be induced if mechanical fasteners were to join insert 370 to rotor brake discs 336.

Figure 4:
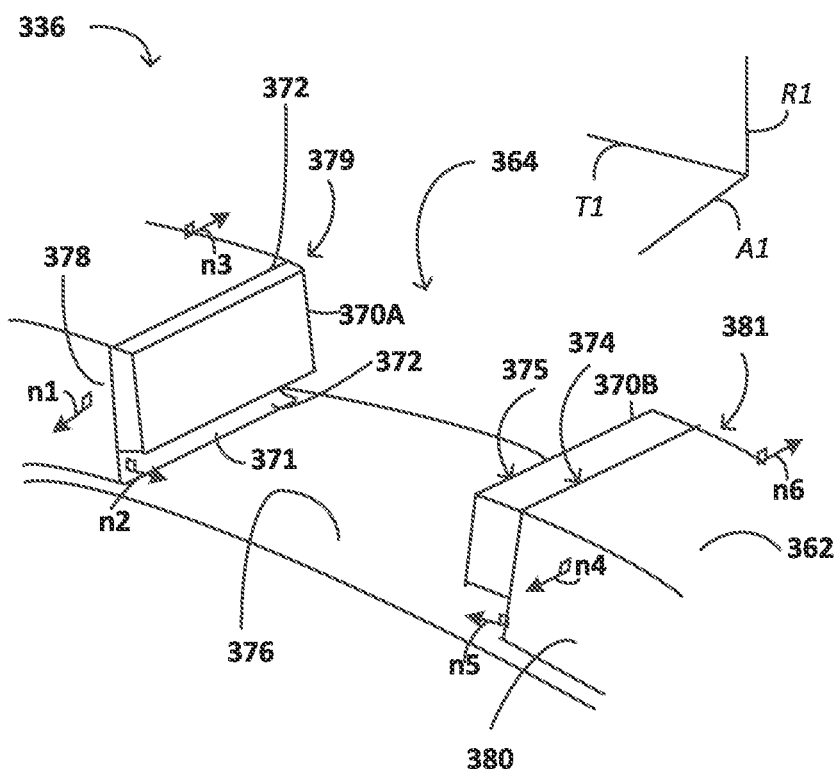
FIG. 4 is conceptual view of a portion of the example rotor brake disc of FIG. 3.

Inserts 370 engage with slot 364 of brake disc 336 such that inserts 370 reside between the surfaces of slot 364 when rotor drive key 340 loads slot 364. FIG. 4 is a diagram schematically illustrating a section of rotor brake disc 336 and a section of slot 364 defined by brake disc 336. Slot 364 is defined by outer perimeter 362 of rotor brake disc 336. Axial, radial, and tangential directions are indicated by line A1, line R1, and line T1, respectively. Line A1, line R1, and line T1 may be parallel to line A, line R, and line T respectively (FIG. 3).

Slot 364 includes first surface 372 and second surface 374 on opposite sides of slot 364 from each other. In addition, in the example shown in FIG. 4, surfaces 372, 374 oppose each other. First surface 372 and second surface 374 may each be positioned along outer perimeter 362 of rotor brake disc 336. First surface 372 and/or second surface 374 define a portion of slot 364, and are each configured to bear a tangential force imparted by a rotor drive key (e.g., rotor drive key 340 (FIG. 3)) during a braking operation. First surface 372 and second surface 374 may be configured to face and/or interface with rotor drive key 340 (FIG. 3) when rotor drive key 340 extends axially through slot 364. First surface 372 and second surface 374 may substantially face each other, such that a first vector from first surface 372 toward second surface 374 projects onto line T1 in a first tangential direction, and a second vector from second surface 374 toward first surface 372 and parallel to the first vector projects onto line T1 in a second tangential direction opposite the first tangential direction.

Rotor brake disc 336 also includes a third surface 378 and a fourth surface 380. Third surface 378 of rotor brake disc 336 ("third disc surface 378") is adjacent to slot 364 and may have a common boundary (e.g., a sharp or rounded corner) with first surface 372. Fourth surface 380 of rotor brake disc 336 ("fourth disc surface 380") is adjacent to slot 364 and may have a common boundary (e.g., a sharp or rounded corner) with second torque face 374. Rotor brake disc 336 may further include a fifth disc surface 379 on a side of rotor brake disc 336 opposite first disc surface 378, and may include a sixth disc surface 381 on a side of rotor brake disc 336 opposite fourth disc surface 380. Fifth surface 379 of rotor brake disc 336 ("Fifth disc surface 379") is adjacent to slot 364 and may have a common boundary (e.g., a sharp or rounded corner) with first surface 372. Sixth surface 381 of rotor brake disc 336 ("sixth disc surface 381") is adjacent to slot 364 and may have a common boundary (e.g., a sharp or rounded corner) with second surface 374. First surface 372 may be between third disc surface 378 and fifth disc surface 379, and second surface 374 may be between fourth disc surface 380 and sixth disc surface 381.

Third disc surface 378- and fifth-disc surface 379 may be non-intersecting surfaces of rotor brake disc 336, and may be separated by outer perimeter 362 and/or some portion of rotor brake disc 336. Fourth disc surface 380 and sixth disc surface 381 may be non-intersecting surfaces of rotor brake disc 336, and may be separated by outer perimeter 362 and/or some portion of rotor brake disc 336.

Third disc surface 378, fourth disc surface 379, fifth disc surface 380, and/or sixth disc surface 381 may have any suitable orientation relative to the axial A1, radial R1, and tangential T1 directions. In an example, a unit vector n1 extends from and is perpendicular to a portion of third disc surface 378 and a unit vector n2 extends from and is perpendicular to a portion of first surface 372, and a projection of the unit vector n1 on the line A1 is greater than a projection of the unit vector n2 on the line A1. In some examples, a unit vector n3 (shown in hidden lines) extends from and is perpendicular to a portion of third disc surface 379, and a projection of the unit vector n3 on the line A1 is greater than a projection of the unit vector n2 on the line A1. In an example, a unit vector n4 extends from and is perpendicular to a portion of second 380 and a unit vector n5 (shown in hidden lines) extends from and is perpendicular to a portion of second torque face 374, and a projection of the unit vector n4 on the line A1 is greater than a projection of the unit vector n5 on the line A1. In some examples, a unit vector n6 (shown in hidden lines) extends from and is perpendicular to a portion of fourth disc surface 381, and a projection of the unit vector n6 on the line A1 is greater than a projection of the unit vector n5 on the line A1.

Slot 364 also defines bottom surface 376, which is the radially innermost surface of slot 364. In some examples, slot 364 may define bottom surface 376 such slot 364 extends further toward the radial center of rotor disc 336 (FIG. 3) than drive key 340 (FIG. 3). Stated similarly, the distance between outer perimeter 362 and bottom surface 376 of slot 364 may be greater that the length that drive key 340 extends into slot 364. In this way, drive key 340 and rotor brake disc 336 may not interface at bottom surface 376, in order to substantially reduce or eliminate radially oriented mechanical stresses imparted to rotor brake disc 336.

As illustrated in FIG. 4, slot 364 includes first insert 370A joined without mechanical fastening to first surface 372 of slot 364. Second insert 370B is joined to second surface 374 of slot 364 without mechanical fastening. Example techniques for joining without mechanical fastening, including joining by braze material, will be further described below, but any suitable joint that reduces or minimizes wear of rotor brake disc 336 by elimination of mechanical fasteners may also be considered. Although illustrated as two separate inserts 370 joined to two separate surfaces 372, 374 of slot 364 in FIG. 4, alternative arrangements are considered. For example, a single insert such as first insert 370A may be a single, integral piece that is joined to first surface 372, second surface 374, and bottom surface 376. Additionally, or alternatively, a single insert may be joined one one or more of third surface 378, fourth surface 379, fifth surface 380, and/or sixth surface 381 in addition to first surface 372, second surface 374, or bottom surface 376. As such, inserts 370 may define a tough mechanical surface that protects rotor brake disc 336 during braking operations. In some examples, more than two inserts may be utilized to cover any or all of the slot surfaces.

As mentioned above, rotor brake discs 236 (FIG. 2), 336 (FIG. 3) and stator brake discs 238 (FIG. 2) may comprise a carbon composite. In some examples, articles or components, such as rotor brake discs 236, 336 and/or 238 described above, may include a high temperature coating to protect an underlying substrate from oxidation and prepare one or more surfaces of rotor brakes 236 and/or 336, and/or stator brake discs 238 for joining to inserts 370 without mechanical fastening. Following application of a high temperature coating, any or all of the rotor disc surfaces of slot 364 may be joined to inserts 370, to secure inserts 370 during braking operations without mechanical fasteners. Absent application of the high temperature coating described herein, it may be difficult to join inserts 370 to rotor brake disc 336 by braze material, because braze material may not properly wet the substrate surfaces of rotor disc 336. For example, while substrates that include a carbon matrix may provide high temperature resistance and mechanical strength, such a carbon matrix may be difficult to bond to other components using a brazing material. During brazing two or more components, a braze material may wet various surfaces of the components to form a strong joint. However, carbon composites may not form sufficiently strong bonds to resistant forces between the components. Any or all of the rotor disc surfaces of slot 364 of rotor brake discs 336 described above with respect to FIG. 4 may be prepared for joining to an insert by application of a high temperature coating.

Figure 5:
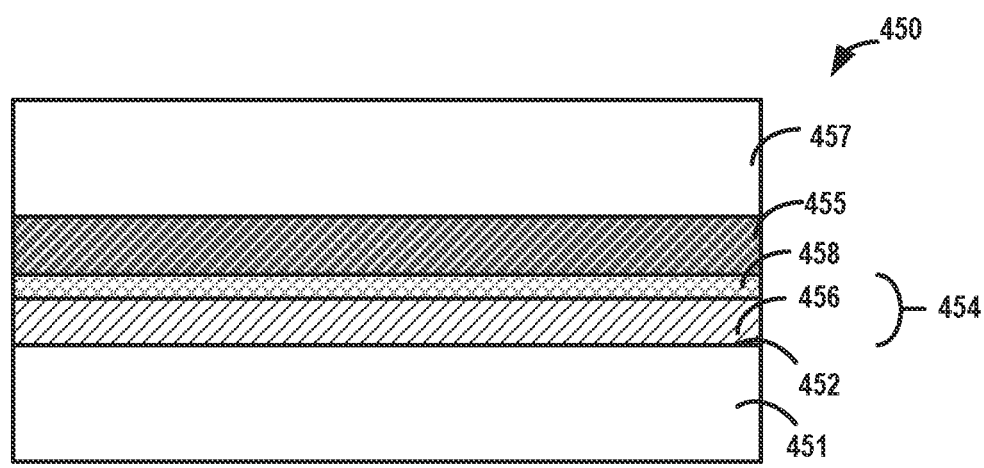
FIG. 5 is a cross-sectional side view diagram illustrating an example article that includes a braze material joining a second component to a first component, according to examples of the disclosure.

FIG. 5 is a cross-sectional side view diagram illustrating an example article 450. Article 450 includes first component 451 and second component 457 joined by braze material 455, according to examples of the disclosure. First component 451 includes a high temperature coating 454 which includes a bond layer 456 of a metal carbide which provides a bond layer for braze material 455.

First component 451 includes a carbon composite substrate 452 having a carbon matrix. In some examples, carbon composite substrate 452 includes a carbon/carbon (C/C) composite substrate. Additionally, or alternatively, first component 451 may include a carbon substrate such as a graphite substrate, or another monolithic ceramic substrate. A C/C composite substrate may include carbon-based reinforcement fibers and a carbon-based matrix material at least partially surrounding the carbon-based reinforcement fibers.

In some examples, carbon composite substrate 452 may be formed form a porous preform that includes carbon fibers or carbon-precursor fibers. Examples of porous preforms that may be used to produce carbon composite substrate 452 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms. In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include predefined layers, but, rather, may be formed from a bundle of fibers that are mechanically bound together, e.g., via needling. In other examples, a combination of any of the aforementioned types of porous preforms can be used.

Carbon composite substrate 452 may also include a carbon matrix material that at least partially encapsulates the fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like.

Carbon composite substrate 452 may be subject to high temperatures during operation. As one example, carbon-carbon composite brake discs (e.g., rotor brake disc 336, FIG. 3), may be subject to temperatures as high as about 3,000 degrees Fahrenheit (° F.) (about 1,649° C.) during braking events. To protect carbon composite substrate 452 from oxidation and to provide a bond layer for braze material 455 that withstands such temperatures, article 450 includes a high temperature coating 454 on one or more surfaces of carbon composite substrate 452. Coating 454 may be stable at temperatures of up to about 3600° F. (about 2000° C.). In this context, "stable" may mean that coating 454 does not degrade into its constituent elements, does not react with carbon, and/or does not react with other elements or compounds present in the environment in which coating 454 is used including, but not limited to, oxidation, for a period of time (e.g., minutes or hours). Coating 454 may have any suitable thickness. In some examples, a thickness of coating 54 may be between about 1 micrometer (μm) and about 30 μm. In some examples, a thickness of coating 54 may be self-terminating and determined by diffusion properties of the metal carbon system.

High temperature coating 454 includes bond layer 456 on a surface of substrate 452. Bond layer 456 includes a metal carbide. In some examples, bond layer 454 may consist essentially of metal carbide. Metal carbides may have high strength, wear-resistance, and temperature resistance, and may be chemically compatible with underlying substrate 452 and braze material 455. Furthermore, bond layer 456 may improve the adhesion of braze material 455 to substrate 452, relative to examples which do not include bond layer 456. The metal carbide of bond layer 456 may include any metal carbide capable of being formed in situ between reactive carbon and a liquid metal infiltrated into the reactive carbon. In some examples, the metal carbide includes at least one of silicon carbide, titanium carbide, or tungsten carbide, which may provide for further improvements to one or more properties of bond layer 456, such as the bonding performance. In some examples, still further performance improvement may be captured by making the metal carbide layer of bond layer 456 metal-rich (e.g., having a stoichiometrically greater amount of metal than carbon).

As will be explained further in FIGS. 6-8J below, bond layer 456 may further prepare first component 451 for joining to second component 457 with braze material 555 by improving the surface of substrate 452 for bonding (e.g., by reducing a surface roughness of substrate 452, changing the chemistry of the surface of substrate 452 to improve wettability of braze material 455, or both).

In some examples, bond layer 456 may be formed by converting a surface portion of substrate 452 from carbon to metal carbide. In some examples, bond layer 456 may be a relatively dense layer formed from a dense carbon infiltrated and reacted with a metal. Bond layer 456 may be formed from carbon at a surface portion of carbon composite substrate 452. In some examples, the reactive carbon may only include carbon present as part of substrate 453. However, in some examples, the reactive carbon may include both carbon of carbon composite substrate 452 and carbon applied to the various voids in carbon composite substrate 452. Bond layer 456 may extend into one or more surface voids, such as defects or pores, on the surface of the carbon composite substrate 452 to form a continuous layer that substantially encapsulates substrate 452. For example, substrate 452 may include surface voids that extend from an outer surface of substrate 452 into a bulk of substrate 452. Surface voids may include defects such as cracks, inherent structures such as surface pores, or other voids or roughness in the surface that extend into substrate 452 and may have relatively complex or irregular surfaces. These surface voids may form discontinuities in a metal carbide layer formed from substrate 452 and permit oxidizing species to react with the underlying substrate 452 if braze material 455 does not fill these discontinuities.

Although not necessary, because conversion of reactive carbon of carbon composite substrate 452 is typically sufficient to provide bond layer 456 which will not delaminate from first component 451, in some examples reactive carbon may be added to the surface and used to densify the surface portion of C/C composite substrate 452. Reactive carbon may be applied in a variety of ways, or not at all. In some examples, bond layer 456 may be formed by reacting a metal with both a surface portion of C/C composite substrate 452 and carbon powder packed into the surface voids, such that portions of bond layer 456 may extend into and substantially fill surface voids, such as defects or pores, in the surface of substrate 452 and bridge with portions of bond layer 456 on the remaining unreacted carbon composite substrate 452 to form a substantially continuous coating.

In many cases, bond layer 456 may be suitably bonded first component 451. However, in some examples, it may be desirable to form a uniform, defect-free coating. To form a more uniform, defect-free coating, bond layer 456 may include a metal carbide that is formed from both carbon matrix of a surface portion of carbon composite substrate 452 and carbon powder within the surface voids having a substantially same composition and morphology as the surface portion of carbon composite substrate 452. For example, prior to reaction with a metal, substrate 452 may include a surface portion (e.g., outer-most 10-20 microns) that includes carbon matrix capable of reacting with the metal to form a metal carbide. Without being limited to any particular theory, the carbon matrix of the surface portion may have a particular composition and/or morphology, such as microstructure, phase composition, geometry of component phases, morphology of components phases, and/or dimensions and distribution of ceramic fibers or pores, crystal structure, presence and type of impurities, particle morphology shape and size, crystal surface terminations (e.g., active facets), crystal defects, and/or surface functionalization. This particular composition and/or morphology may result in a reaction with the metal according to particular reaction thermodynamics and kinetics, such as a temperature of reaction and a rate of reaction.

Similarly, prior to reaction with a metal, carbon powder filling the surface voids may have a similar composition and/or morphology as the surface portion of substrate 452. As a result of a substantially similar composition and/or morphology as the surface portion of substrate 452, the carbon powder may have a substantially similar reaction thermodynamics and kinetics as the surface portion of substrate 452. By forming a metal carbide formed from both the carbon matrix of carbon composite substrate 52 and carbon powder having a substantially same composition and/or morphology as carbon composite substrate 452, bond layer 456 may be formed at substantially the same time and rate, thereby bridging metal carbide in the surface voids with metal carbide on unreacted carbon composite substrate 452. In this way, bond layer 456 may form an even more robust bond with the bulk matrix of first component 451 in some examples, and also provide a bonding surface for braze material 455.

Bond layer 456 may, in some examples, be metal-rich, such that bond layer 456 may include a metal carbide having metal in stoichiometric excess. For example, during formation of the metal carbide from the carbon matrix of the surface portion of substrate 452 and the carbon powder in the surface voids, a portion of excess metal may remain in bond layer 456. The metal may form a metal oxide that may migrate to form a passivation layer, such as an outer layer 458 described below, or may fill small cracks or pores in bond layer 456 caused by a difference in coefficient of thermal expansion between substrate 452 and bond layer 456, such as by expanding through oxidation of the excess metal at high temperatures in the presence of oxidation during operation. As a result, the metal of bond layer 456 may perform a passivation and/or self-healing function to further protect substrate 452 and/or further improve the surface of substrate 452 for bonding with braze material 455.

In some examples, coating 454 may include an optional outer layer 458 of a metal oxide on bond layer 456. Outer layer 458 including a metal oxide is an optional layer, because braze material 455 may be applied to bond layer 456 before outer layer 458 may form, and because bond layer 456 may bond sufficiently to braze material 455 without the presence of outer layer 458. In some examples, outer layer 458 may form during operation of article 450. For example, metal that reacts with the carbon matrix of the surface portion of C/C composite substrate 452 and the carbon powder in the surface voids during formation of bond layer 456 may be applied to the surface of C/C composite substrate 52 as metal powder or particles. This metal powder may include metal oxide surface layers that form in an oxidizing atmosphere, such as an oxide of the underlying metal or an oxide of a different element. For example, the metal oxide surface layers may have a thickness between about 1 nanometer and about 1 micrometer. During formation of bond layer 456, the metal oxides may migrate to a surface of bond layer 456 and form outer layer 458. Outer layer 458 may have a relatively high temperature resistance, such as greater than about 1500° C. In this way, metal oxides that may otherwise be present in the bond layer 456 as impurities may form a further protective layer to protect substrate 452 from oxidation, and may provide an even better bonding surface for braze material 455 than the metal carbide of bond layer 456 would on its own. High temperature coatings described herein, such as coating 454 of FIG. 2 above, may be formed in situ on carbon composite substrates to form a dense, antioxidant bond layer that is wettable by braze material, as will be described with respect to FIG. 8 below.

Article 450 includes braze material 455 which joins first component 451 to second component 457. Braze material 455 may include a platinum group metal such as platinum, rhodium or the like. Braze material 455 may define a thickness between first component 451 and second component 457, and the thickness of braze material 455 may be between about 0.5 millimeters (mm) and about 20 mm. In some examples, braze material 455 or a precursor to braze material 455 may be applied to an interface between bond coating 456 of substrate 452 of first component 451 by one or more of a painting process, taping process, sputtering process, or other suitable method, then braze material may be heated until it is at least softened. Braze material 455 may cool and cure to join first component 451 to second component 457 securely, such that article 450 may be used as part of a high temperature application such as a brake assembly.

Article 450 includes second component 457. Second component may be configured to define a tough mechanical contact surface configured to protect first component 451. In some examples, second component 457 may be an insert 370 joined to a rotor brake disc 336, as described above. In some examples, second component 457 may include a carbon composite component, such as a C/C carbon composite component. In such examples, second component 457 may include a similar high temperature coating including a bond layer of metal carbide, as described above with respect to first component 451 above.

In some examples, each of substrate 452 of first component 451 and second component 457 may define a coefficient of thermal expansion (CTE). In some examples, the magnitude of a difference between the CTE defined by first component 451 and the CTE defined by second component 457 may be less than 5 parts per million per degree Celsius (ppm/° C.), such as less than 4 ppm/° C. or less than 2 ppm/° C. In some examples, first component 451 and second component 457 may each define a substantially similar CTE, such that the magnitude of a difference between the CTE defined by first component 451 and the CTE defined by second component 457 is less than about 1 ppm/° C. First component 451 and second component 457 each defining a substantially similar CTE may be advantageous to reduce stresses induced in braze material 455 caused by variance in rates and/or magnitudes of expansion and/or contraction during temperature cycling (e.g., braking vs. non-braking periods of brake assemblies), which may result in failure of the bond between first component 451 and second component 457.

In some examples, second component 457 may include a monolithic ceramic. Monolith ceramics materials as second component 457 may be desirable as second component 457 where second component 457 is configured to act as a insert in a brake assembly (FIGS. 1-4 above), because monolithic ceramic material may have a desirable combination of providing a tough mechanical contact surface which may protect first component 451, low CTE to eliminate and/or minimize a CTE difference between carbon composite first component 451 and second component 457, and other desirable properties. In examples where second component 457 includes a monolithic ceramic material, the monolithic ceramic material may include a rare-earth silicate. The rare-earth silicate may be a rare-earth monosilicate with general formula $RE_2SiO_5$, where RE is a rare-earth element. Additionally, or alternatively, second component 457 may include a rare-earth disilicate with general formula $RE_2Si_2O_7$. For example, second component 457 may include ytterbium disilicate as the monolithic ceramic material.

Figure 6:
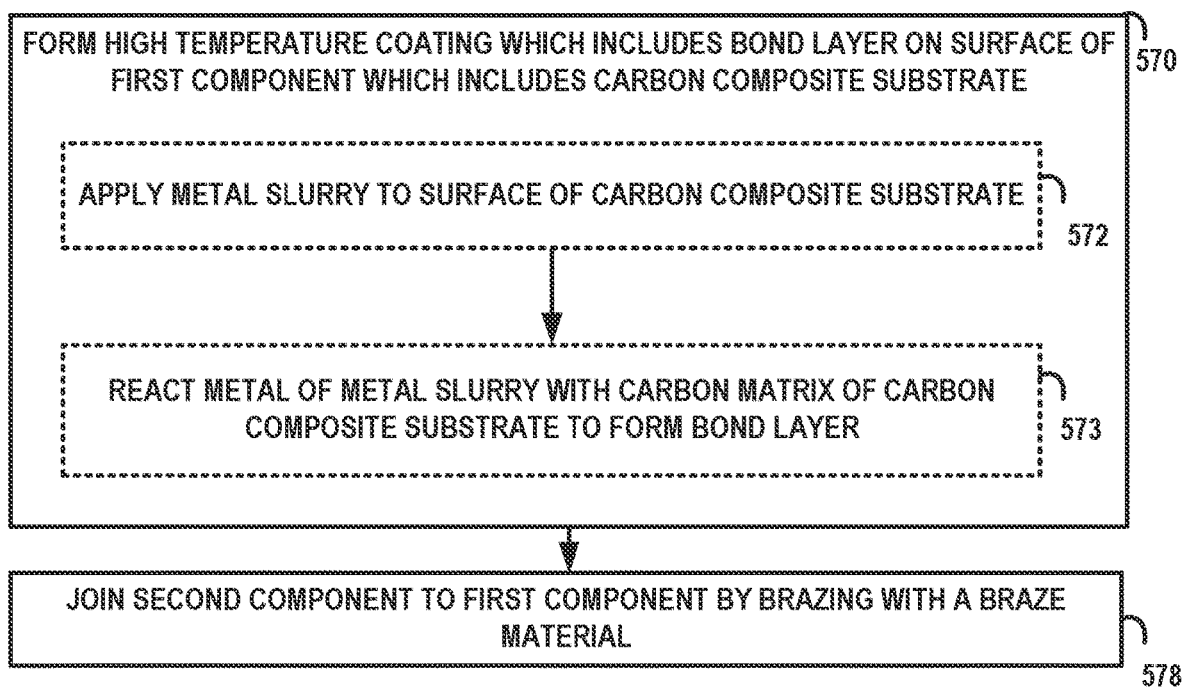
FIG. 6 is a flow diagram illustrating an example technique for joining a first component to a second component, according to examples of the present disclosure.

FIG. 6 is a flow diagram illustrating an example technique for joining a first component to a second component by braze material. The technique of FIG. 6 may be suitable for forming articles such as article 450 of FIG. 5. Although described below primarily with respect to article 450 of FIG. 5, other techniques may be used to form article 450, and the illustrated technique may be used to form other articles. The technique of FIG. 6 includes forming a high temperature coating which includes a bond layer on a surface of a first component which includes a carbon composite substrate (570). The technique also includes joining a second component to the first component with braze material (578). Steps 572 and 573 illustrate an optional example technique for forming the high temperature coating of step 570, and thus are illustrated in dashed lines. Steps 572 and 573 may be especially suitable in examples where the first component is a C/C composite material. Other techniques for forming the high temperature coating are considered, such as the technique of FIG. 7 discussed below.

The example technique of FIG. 6 optionally includes applying a metal slurry to the surface of the carbon composite substrate (572). The metal may be applied in any form, including as a liquid or a gas. The metal slurry may include metal particles in an application medium. In some examples, the metal particles of the metal slurry include at least one of silicon, titanium, or tungsten. The metal particles may be coated by a thin layer of a metal oxide, such as may be formed in an oxidizing atmosphere during formation or shelf-life of the metal particles. For example, a relatively pure feedstock of metal particles may be prohibitively expensive due to inert storage, such that use of metal particles that include a metal oxide film may broaden available feedstocks of material for the metal particles and/or reduce a cost of the metal particles.

The example technique of FIG. 6 optionally may include reacting a metal of the metal slurry with carbon of carbon composite substrate 452 to form high temperature coating 454, which includes a bond layer 456 of metal carbide on the carbon composite substrate (573). In some examples, to react the metal of metal slurry and carbon of the surface portion of carbon composite substrate 452, the metal may be fluidized (e.g., melted or sublimated) such that the metal may infiltrate into carbon composite substrate 452 and the surface portion of carbon composite substrate 452 and react with carbon of the carbon matrix of the surface portion of the carbon composite substrate 452 to form a metal carbide. This metal carbide may form bond layer 456, which may provide a wettable surface on first component 451 that braze material 455 can form a robust bond with relative to the carbon matrix of carbon composite substrate 452 without high temperature coating 454.

The technique of FIG. 6 also includes technique includes joining a second component to a first component by brazing with a braze material (578). With concurrent reference to FIGS. 5 and 6, braze material 455 may be applied directly on bond layer 456, and outer layer 458 may be omitted. In some examples, joining a second component to a first component by brazing may include applying a braze material of the present disclosure to bond layer 456. Braze material 455 may be applied by any suitable means, including but not limited to painting, taping, placing a foil or preform, spraying, sputtering, or the like. In some examples, braze material 455 may be applied to substrate 452 at a thickness of between about 0.5 mm to about 20 mm through any of the above techniques or other techniques.

In some examples joining second component 457 to first component 451 may include heating braze material 455 to at least soften the braze material. Heating braze material 455, in some instances, may comprise heating the braze material to at least 1000° C., such as about 1500° C. In some examples, the heating step of the brazing process may include heating braze material 455 disposed between first component 451 and second component 457 for a length of time between about 1 minute and about 20 minutes. In some examples, joining second component 457 to first component 451 by brazing with braze material 455 may include cooling braze material 455 disposed between first component 451 and second component 457. In some examples, the cooling step of the brazing process may include merely removing article 450 which includes the joined components 451, 457 from a hot location or away from a heat source. However, in some examples, cooling may include cooling at a controlled rate. For example, braze material 455 may cool and cure to join components 451, 457 at a controlled rate. In some examples, the controlled rate of cooling may be between about 1° C./minute and about 300° C./minute, such as between about 5° C./minute and about 100° C./minute.

Figure 7:
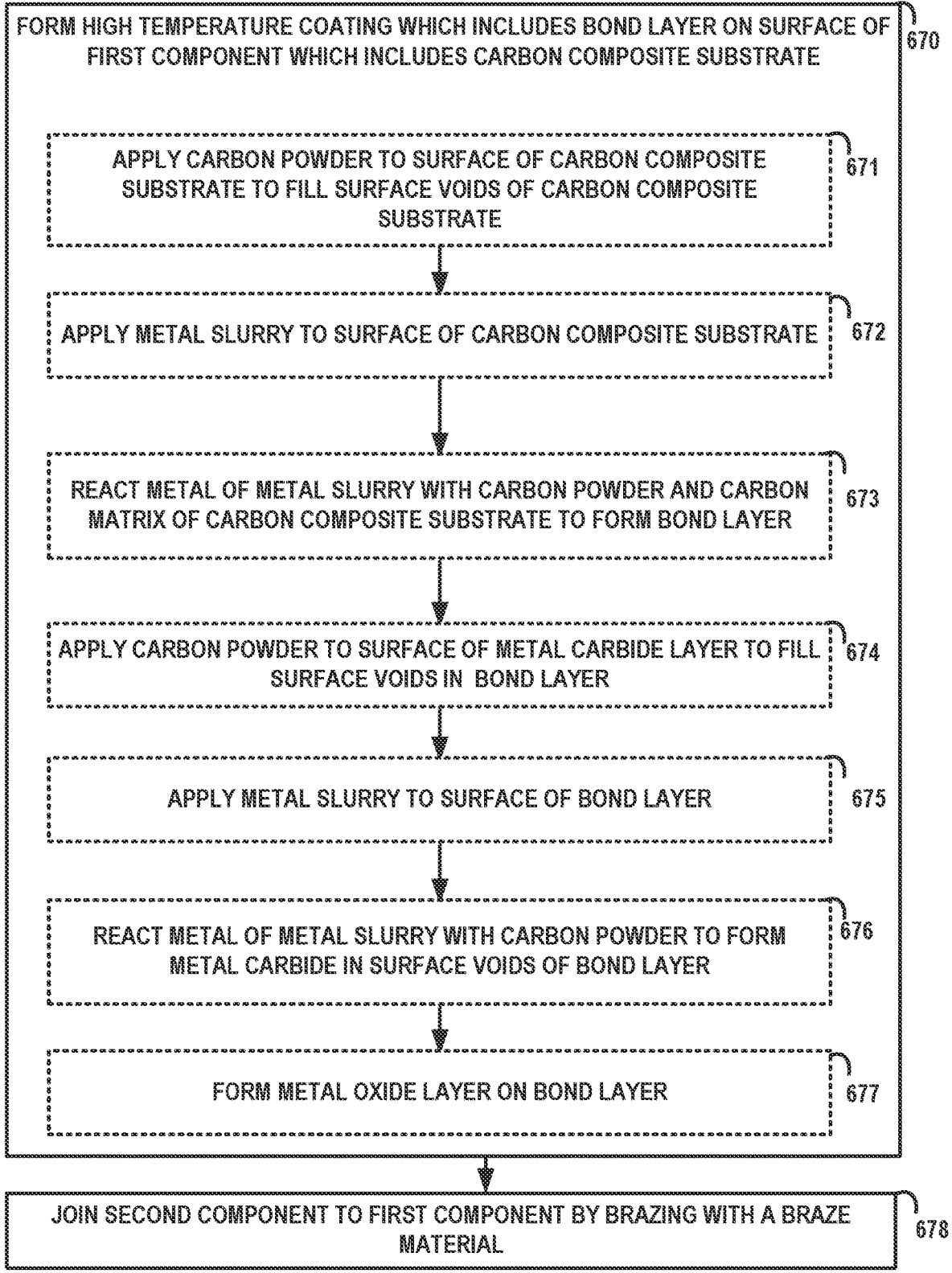
FIG. 7 is a flow diagram illustrating an example technique for joining a first component to a second component, according to examples of the disclosure.

FIG. 7 is a flow diagram illustrating an example technique for joining a first component to a second component by braze material. The technique of FIG. 7 may be an example of the technique of FIG. 6 illustrated above. The technique of FIG. 7 includes forming a high temperature coating which includes bond layer on a surface of a first component which includes a carbon composite substrate (670). The technique also includes joining a second component to the first component by brazing with braze material (678). Steps 671 through 677 illustrate an optional example technique for forming the high temperature coating of step 670, and thus are illustrated in dashed lines. Steps 671 through 671 may especially be suitable in examples where the first component is a C/C composite material that defines a particularly rough surface for brazing, because the surface may be smoothed by the illustrated technique. Other techniques of forming the high temperature coating are considered, including but not limited to the relatively simpler technique of FIG. 6. The example technique of FIG. 7 will be described with respect to FIGS. 8A-8J, which illustrate various steps for forming high temperature coatings and brazing components with braze material, and FIG. 10, which illustrates an example system or sequence of systems for forming a high temperature coating.

Figure 8A:
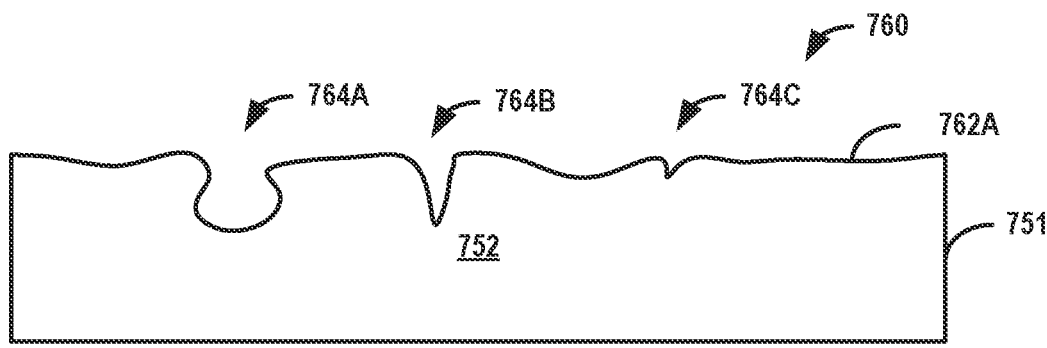
FIG. 8A is a cross-sectional side view diagram illustrating a portion of an example carbon composite substrate that includes surface voids, according to examples of the disclosure.

As described above with respect to substrate 452 of FIG. 5, substrate 452 may include various surface voids that, if left unsealed or partially sealed, may permit oxidizing species to penetrate into and react with substrate 452, and or may not provide a suitable bonding surface for braze material 455. FIG. 8A is a cross-sectional side view diagram illustrating a portion 760 of an example C/C composite substrate 752 of first component 751, according to examples of the disclosure. Substrate 752 defines an initial outer surface 762A. Surface 762A includes one or more surface voids 764A, 764B, 764C (individually "void 764" and collectively "voids 764"). Voids 764 may include any irregularity or deviation from a general plane of surface 762A that may otherwise produce a discontinuity in a metal carbide coating formed from the surface portion of substrate 752 unless filled. For example, a pore having high curvature may result in inhibited reaction with a metal, and thus may be a void 764 to be filled, while a shallow depression having low curvature may not result in inhibited reaction with an infiltrated metal, and thus may not be a void 764 to be filled. In some examples, voids 764 may include one or more pores 764A, one or more cracks 764B, and/or one or more surface projections or depressions 764C. These voids 764 may be formed during formation of substrate 752, and manufacturing efforts to reduce voids 764 may be relatively expensive. Voids 764 may have relatively complex surfaces that define relatively complex volumes that may be difficult to fill. For example, relatively large reactant particle size and/or high slurry viscosity may limit penetration of metal reactants into voids 764.

Figure 8B:
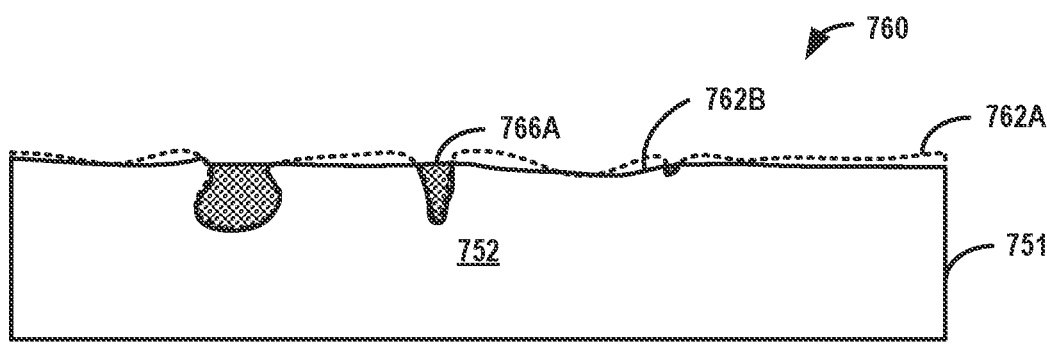
FIG. 8B is a cross-sectional side view diagram illustrating the portion of the example carbon composite substrate of FIG. 8A with carbon powder filling the surface voids, according to examples of the disclosure.

Referring back to FIG. 7, the example technique may include applying carbon powder to a surface of a carbon composite substrate to fill surface voids of the carbon composite substrate (671). In the example of FIGS. 8A-8J, the carbon composite substrate is a carbon/carbon (C/C) composite. Applying the carbon powder to the surface may include coating the surface of the C/C composite substrate with the carbon powder and forcing the carbon powder into one or more surface voids of the surface of the C/C composite substrate. FIG. 8B is a cross-sectional side view diagram illustrating portion 760 of the example C/C composite substrate 752 of FIG. 8A with a carbon powder 766A filling surface voids 764, according to examples of the disclosure. Applying carbon powder 766A to a surface 762B may include distributing carbon powder 766A on surface 762B and forcing carbon powder 766A into one or more voids 764 of surface 762B (e.g., to pack or at least partially fill the surface voids with powder). As a result, carbon powder 766A may penetrate into voids 764.

Carbon powder 766A may have a substantially same composition and morphology as a surface portion of C/C composite substrate 752 at or near surface 762B. For example, the microstructure and/or crystallinity of carbon powder 766A may be substantially the same as the microstructure and/or crystallinity of material of substrate 752 near surface 762B and voids 764. Carbon powder 766A having a substantially same composition and morphology as the surface portion of C/C composite substrate 752 may have a substantially same reaction thermodynamics and kinetics as the surface portion of C/C composite substrate 752, such that reaction of an infiltrated metal with carbon powder 766A and carbon matrix of a surface portion of C/C composite substrate 752 may occur at substantially the same temperature and substantially the same rate. As explained above, reaction thermodynamics and kinetics of each of carbon powder 766A and the carbon matrix of C/C composite substrate 752 may be a product of a respective type, feedstock source, processing history, and other properties and conditions of carbon powder 766A and C/C composite substrate 752 that influence a temperature and rate at which carbon powder 766A and the carbon matrix of C/C composite substrate 752 may react with an infiltrated metal.

In some examples, applying carbon powder 766A to surface 762B of substrate 752 may include applying carbon powder 766A as a separate powder in a slurry or mixture to surface 762B of substrate 752. As one example, carbon powder 766A may be ground from one or more portions of substrate 752 and/or from feedstock similar in composition and/or morphology to substrate 752 and applied to surface 762B. For example, during processing of C/C composite substrate 752, carbon powder may be produced through various abrasive or other operations. This carbon powder may be further processed, such as by milling, to produce carbon powder 766A having a similar processing history as C/C composite substrate 752. As another example, carbon powder 766A may be selected or obtained having a composition and/or morphology that substantially matches the composition and/or morphology of the surface portion of substrate 752 and applied to surface 62. For example, carbon powder 766A may be selected or obtained from a feedstock produced under similar processing conditions as C/C composite substrate 752.

In some examples, applying carbon powder 766A to surface 762B of substrate 752 may include applying a force to surface 762B to force and pack carbon powder 766A into voids 764. For example, the force may include a normal force to surface 762B and/or any lateral forces to spread and/or fill voids 764. The force applied to carbon powder 766A may force carbon powder 766A into surface voids 764 prior to forming a metal carbide and pack carbon powder 766A into surface voids 764, such that carbon powder 766A is retained in surface voids 64, such as up to between about 50 vol. % and about 60 vol. % packing. In some instances, a carrier medium may be applied to carbon powder 766A, such as a volatile medium to aid in dispersing carbon powder 766A into voids 764. For example, carbon powder 766A may be dispersed in the carrier medium to form a slurry corresponding to a relatively high packing. A variety of methods may be used to force and pack carbon powder 766A into surface voids 764 including, but not limited to: rotary forces, such as polishing or abrasion; linear forces, such as spackling; manual forces, such as manual sanding (e.g., to generate and force carbon powder 766A); and the like.

In some examples, such as illustrated in FIG. 8B, applying carbon powder 766A to surface 762B of C/C composite substrate 752 may include generating carbon powder 766A directly from substrate 752 by mechanically abrading surface 762A of C/C composite substrate 752. In the example of FIG. 8B, substrate 752 has been abraded to surface 762B from surface 762A, as indicated by the dashed line. For example, rather than separately apply carbon powder 766A, which may be difficult to match to substrate 752, and force carbon powder 766A in a separate step, abrading surface 762A may both generate carbon powder 766A having a substantially same composition and/or morphology as substrate 752 and force carbon powder 766A into voids 764 in a single step. Even within substrate 752, a composition and/or morphology may vary, such as due to different temperatures during formation of substrate 752, such that directly obtaining carbon powder 766A from portions of substrate 752 near surface 762 may generate carbon powder that matches the composition and/or morphology of the material around voids 764. The resulting carbon powder 766A may have an identical composition and morphology as substrate 752 near surface 762B, may be generated proximate to voids 764, and may penetrate into voids 764 without the use of a carrier medium.

Excess carbon powder 766A may be removed from surface 762 prior to reaction with the metal of a metal slurry or mixture, such that surface voids 764 may include carbon powder 766A while low curvature or planar surfaces of surface 762B may not include carbon powder 766A. For example, if carbon powder 766A remains on low curvature or planar portions of surface 762B and is subsequently reacted with a metal, a resulting metal carbide may not strongly adhere to a surface of C/C composite substrate 752, and may be subject to delamination. In some examples, excess carbon powder 766A may be removed from non-void surfaces of surface 762B during packing of carbon powder 766A, such as by polishing surface 762B to force carbon powder 766A into voids 764 while wiping away carbon powder 766A on low curvature or planar surfaces of surface 762B.

Figure 10:
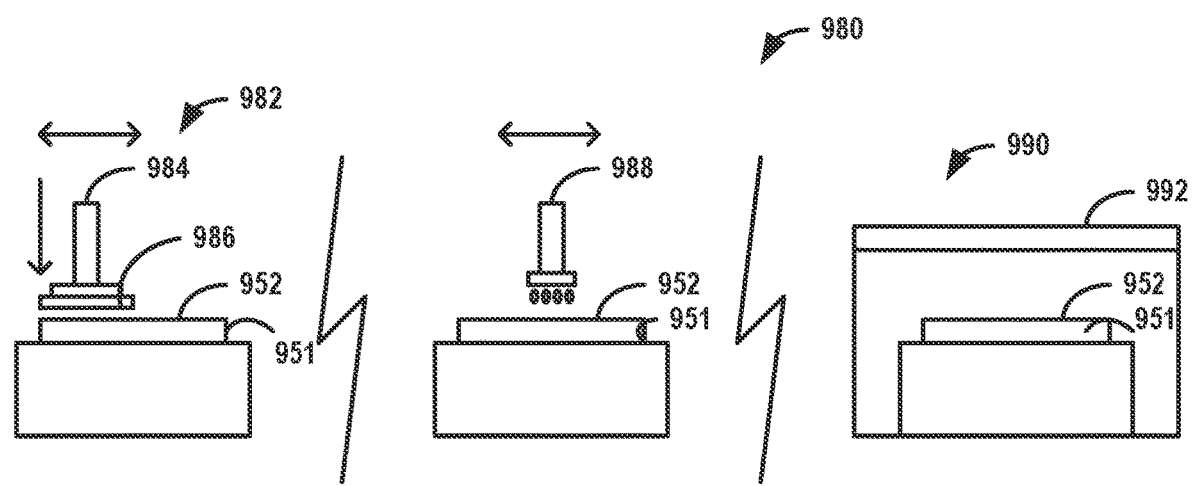
FIG. 10 is a schematic diagram illustrating an example system for joining a second component to a first component with braze material, according to examples of the disclosure.

Referring to FIG. 10, system 980 may include an abrasion system 982 configured to mechanically abrade surface 962 of substrate 952. Abrasion system 982 may include an abrasive surface 986 configured to abrade a surface of substrate 952. Abrasion system 982 may include an actuation system 984 coupled to abrasive surface 986. In some examples, actuation system 984 may be configured to generate a rotary force to rotate abrasive surface 986 or a linear force to drive abrasive surface 986 (e.g., belt). In some examples, actuation system 984 may be configured to exert a lateral force to move abrasive surface 986 to different portions of substrate 952 and exert a downward force on abrasive surface 986 to abrade the surface of substrate 952 and force carbon powder generated from the abrasion into surface voids of substrate 952.

Figure 8C:
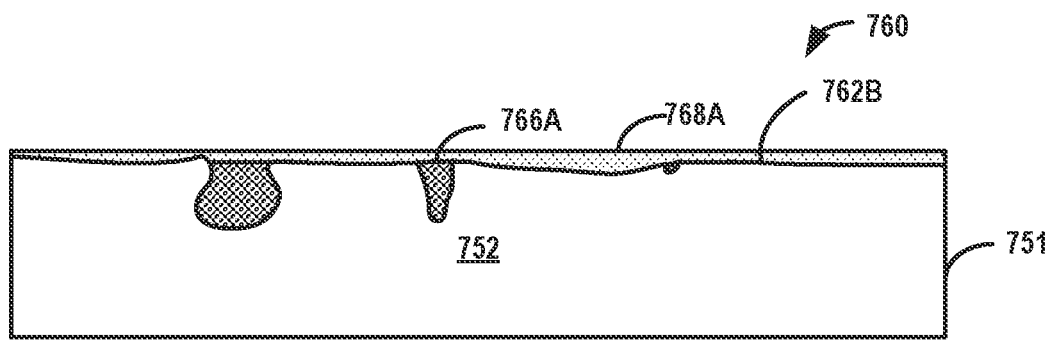
FIG. 8C is a cross-sectional side view diagram illustrating the portion of the example carbon composite substrate of FIG. 8A with carbon powder filling surface voids and a metal slurry on the carbon composite substrate, according to examples of the disclosure.

Referring back to FIG. 7, the example technique may optionally include applying a metal slurry to the surface of the C/C composite substrate (672). FIG. 8C is a cross-sectional side view diagram illustrating portion 760 of the example C/C composite substrate 752 of first component 751 FIG. 8A with carbon powder 766A filling voids 764 and a metal slurry 768A on C/C composite substrate 752, according to examples of the disclosure. While illustrated as a metal slurry 768A, the metal may be applied in any form, including as a liquid or gas.

Metal slurry 768A may include metal particles in an application medium. In some examples, the metal particles of metal slurry 768A include at least one of silicon, titanium, or tungsten. The metal particles may be coated by a thin layer of a metal oxide, such as may be formed in an oxidizing atmosphere during formation or shelf-life of the metal particles. For example, a relatively pure feedstock of metal particles may be prohibitively expensive due to inert storage, such that use of metal particles that include a metal oxide film may broaden available feedstocks of material for the metal particles and/or reduce a cost of the metal particles.

Referring to FIG. 10, system 980 may include a metal application system 988. Metal application system 988 may be configured to apply the metal slurry to a surface of substrate 952. While illustrated in FIG. 10 as a spray system, metal application system 988 may include any system configured to apply a metal slurry to the surface of substrate 952 of first component 951, such as a brush system.

Figure 8D:
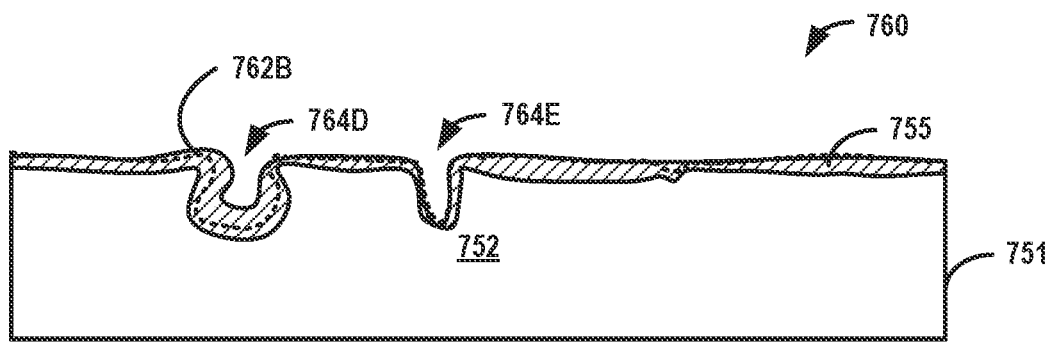
FIG. 8D is a cross-sectional side view diagram illustrating the portion of the example carbon composite substrate of FIG. 8A and a bond layer that includes a surface void, according to examples of the disclosure.

Referring back to FIG. 7, the example technique optionally may include reacting a metal of the metal slurry with carbon of the carbon powder and carbon of the surface portion of the C/C composite substrate to form a bond layer of a metal carbide on the C/C composite substrate (673). FIG. 8D is a cross-sectional side view diagram illustrating portion 760 of the example C/C composite substrate 752 of FIG. 8A and a bond layer 756A, according to examples of the disclosure. To react the metal of metal slurry 768A with the carbon of carbon powder 766A and the carbon of the surface portion of C/C composite substrate 752, the metal may be fluidized (e.g., melted or sublimated) such that the metal may infiltrate into carbon powder 766A and the surface portion of C/C composite substrate 752 and react with carbon of carbon powder 766A and carbon matrix of the surface portion of C/C composite substrate 752 to form a metal carbide. This metal carbide may form a bond layer 756A to substantially seal C/C composite substrate 752 and provide a bonding surface for braze material.

In some instances, this reaction may be limited by diffusion of the metal into the surface portion of C/C composite substrate 752 and carbon powder 766A. As the metal reacts with the surface portion of C/C composite substrate 752 and forms a metal carbide, the newly formed metal carbide may form a diffusion barrier separating the reactants (e.g., carbon and metal), which may stop the thickening and further creation to form thicker metal carbides (e.g., by preventing metal from further penetrating into a depth of the surface portion of C/C composite substrate 752 and/or preventing diffusion of carbon out of C/C composite substrate 752 to react with the metal). On the other hand, as the metal reacts with carbon powder 766A and forms a metal carbide, the powder form of carbon powder 766A may permit the metal to continue to infiltrate around carbon powder 766A, such that a thickness of metal carbide in surface voids 764 may be greater than a thickness of metal carbide on C/C composite substrate 752. In some examples, a size of carbon powder 766A may correspond to a size for which the metal may infiltrate and react (e.g., less than a diffusion limit), such as less than about 20 micrometers (μm), or between about 1 μm and about 5 μm. In contrast, a size of surface voids 764 may be greater than about 100 μm, such as between about 100 μm and about 1000 μm. The metal may be applied to surface 762B of C/C composite substrate 752 until the reaction ends either by diffusion limitation, metal evaporation or exhaustion, or both. For example, any remaining metal on surface 762 may be removed, such as through evaporation. The resulting layer 756A may be a relatively homogeneous metal carbide having a relatively uniform thickness that may include some deviations to fill voids 764. In some examples, a thickness of bond layer 756A at a surface of C/C composite substrate 752 is less than about 50 microns, such as between about 10 microns and about 20 microns. In some examples, a thickness of bond layer 756A in surface voids 764 may be substantially thicker than the thickness of bond layer 756A at the surface of C/C composite substrate 752.

Reaction of the metal of metal slurry 768A with carbon of carbon powder 766A and carbon matrix of the surface portion of C/C composite substrate 752 may be performed under stoichiometric excess of the metal, such that the resulting metal carbide bond layer 756 is metal-rich. Metal-rich bond layer 756A may include a metal carbide phase that includes excess free metal. For example, a metal-rich metal carbide phase may include a stoichiometric ratio of the metal to the carbon of the carbon powder that is greater than 1.1, such as greater than about 1.001:1. By performing the reaction at stoichiometric excess of the metal, the resulting bond layer 756A may include excess metal. During formation of bond layer 756A or during operation of substrate 752 (e.g., as a component), the excess metal may form a metal oxide. In some instances, such as will be described in FIG. 8H, the metal oxide may form a passivation layer that further protects substrate 752. In some instances, the metal oxide may perform a self-healing function for bond layer 756A. For example, the metal oxide may migrate into small cracks that may form during operation, such as due to mismatch in CTE or volumetric expansion, and seal the cracks.

In some examples, reacting the metal of metal slurry 768A with the carbon of carbon powder 766A may include heating surface 762 of substrate 752 above a melting point of the metal and maintaining a vapor pressure of the metal at surface 762 of substrate 752 in stoichiometric excess. A variety of parameters, such as a temperature at surface 762, a concentration (e.g., as indicated by pressure) of the metal at surface 762, and a time of reaction, may be controlled to maintain the metal at stoichiometric excess and encourage migration of the metal into, and reaction with, carbon powder 766A and carbon of the surface portion of C/C composite substrate 752. As one example, for a metal of silicon, the temperature may be maintained at greater than about 1400° C., the pressure may be maintained between about 0.1 mTorr and about 300 mTorr, and the temperature and pressure may be maintained for greater than about one hour.

Referring to FIG. 10, system 980 may include a furnace 990 configured to enclose substrate 952. Furnace 990 may include one or more heaters configured to heat metal particles of metal slurry 968A above the melting point of the metal. Furnace 990 may be configured to maintain a temperature and pressure of the metal such that the metal maintains stoichiometric excess to form a dense first layer 956A. In some instances, furnace 990 may be configured to heat substrate 952 to conductively heat metal slurry 968A. For example, while not shown in FIG. 10, one or more heaters or electrical contacts may be configured to heat (or generate heat within) substrate 952 to heat metal slurry 968A and react the metal of metal slurry 968A with the carbon of carbon powder 966A.

In some instances, the resulting bond layer may still include one or more surface voids. As one example, a surface void in the C/C composite substrate may be substantially large that the carbon powder in the surface void may not react at a same time, resulting in smaller remaining surface voids. As another example, a surface void in the bond layer may extend to a surface of the C/C composite substrate, such as due to pinholes in the bond layer. In the example of FIG. 8D, bond layer 756 includes smaller surface defects 764D and 764E at previous surface defects 764A and 764B, respectively. To fill surface defects 764D and 764E, the method of FIG. 7 may include patching one or more surface voids remaining on the C/C composite substrate and/or surface voids created while forming the bond layer.

Figure 8E:
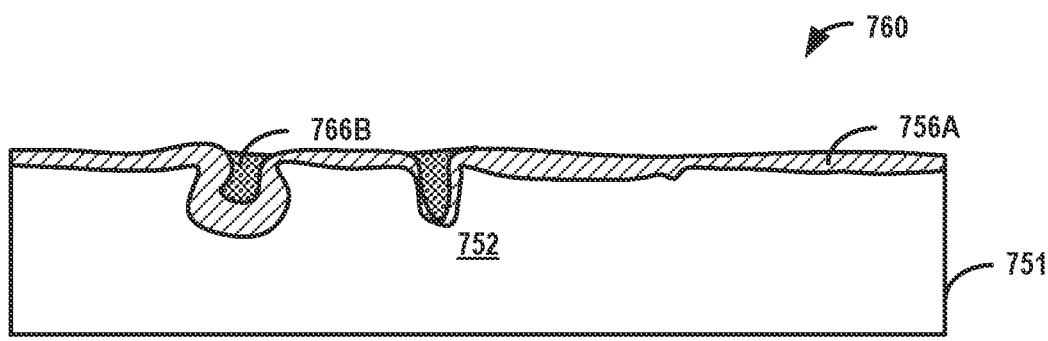
FIG. 8E is a cross-sectional side view diagram illustrating the portion of the example carbon composite substrate of FIG. 8A and a first bond layer with carbon powder filling a surface void in the bond layer, according to examples of the disclosure.

Referring back to FIG. 7, the example technique may include applying a second carbon powder to a surface of the bond layer and applying a second metal slurry to the surface of the bond layer (674). FIG. 8E is a cross-sectional side view diagram illustrating portion 760 of the example C/C composite substrate 752 of FIG. 8A and a bond layer 756A with carbon powder 766B filling surface voids 764D and 764E in bond coating 756A, according to examples of the disclosure. In the example of FIG. 8E, second carbon powder 766B may be applied to a surface of bond layer 756A. In some examples, carbon powder 766B has a substantially same composition or morphology as carbon powder 766A used to form bond layer 756A. Rather than abrade surface 762 of substrate 752 to generate carbon powder, carbon powder 766B may be applied as a slurry or dry powder rub.

Figure 8F:
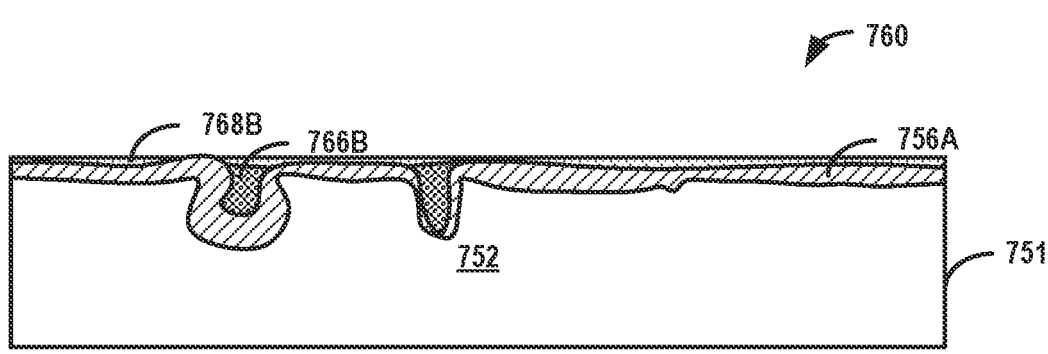
FIG. 8F is a cross-sectional side view diagram illustrating the portion of the example carbon composite substrate of FIG. 8A, a first bond layer with carbon powder filling a surface void in the bond layer, and a metal slurry on the bond layer, according to examples of the disclosure.

Referring back to FIG. 7, in some examples, the example technique may include applying a second metal slurry to the surface of the bond layer (674). FIG. 8F is a cross-sectional side view diagram illustrating portion 760 of the example C/C composite substrate 752 of FIG. 8A, a bond layer 756A with carbon powder 766B filling surface voids 764D and 764E in bond layer 756A, and a metal slurry 768B on the bond layer 756A, according to examples of the disclosure. For example, bond layer 756A may include surface void 764E that extends to a surface of C/C composite substrate 752. Application of second metal slurry 768B may be similar to application of first metal slurry 768A (672).

Figure 8G:
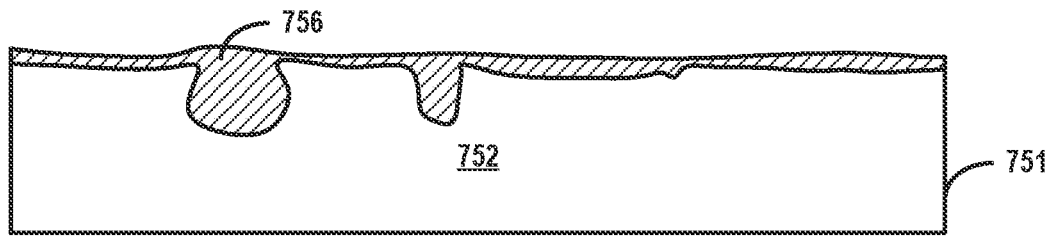
FIG. 8G is a cross-sectional side view diagram illustrating the portion of the example carbon composite substrate of FIG. 8A, a bond layer, and an outer oxide layer, according to examples of the disclosure.

Referring back to FIG. 7, the example technique may include reacting a metal of the second metal slurry with carbon of the second carbon powder to form a metal carbide in the one or more surface voids (676). FIG. 8G is a cross-sectional side view diagram illustrating portion 760 of the example C/C composite substrate 452 of FIG. 8A and bond layer 756, according to examples of the disclosure. The metal of metal slurry 768B may react with the carbon of carbon powder 766B to form a metal carbide in previous surface defect 764D. As a result, bond layer 756 may include fewer surface voids than bond layer 756A formed from only a single application of a carbon powder and metal slurry. Reaction of the metal of metal slurry 768B with carbon of carbon powder 766B may be carried out under similar conditions and using similar processes as reaction of the metal of metal slurry 768A with carbon of carbon powder 766A (673).

While illustrated in FIGS. 8E-8G as a single additional patching process, in some examples, steps 674-76 of FIG. 7 may be repeated for multiple iterations to form a continuous, substantially defect-free bond layer 756, and may include additional processing steps such as cleaning or brushing bond layer 756A such that any loose carbides or carbon powder is removed prior to additional coatings.

Figure 8H:
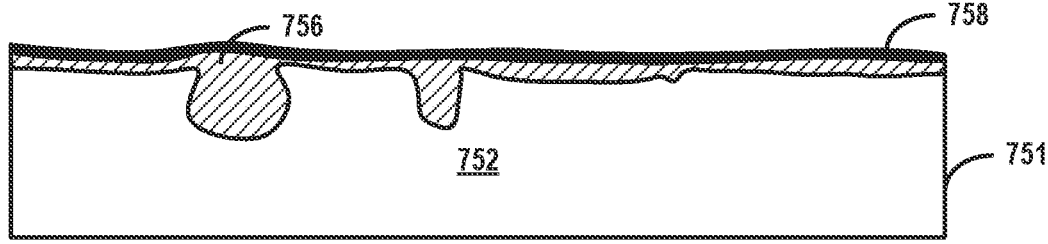
FIG. 8H is a cross-sectional side view diagram illustrating the portion of the example carbon composite substrate of FIG. 8A, a bond layer, and an outer oxide layer, according to examples of the disclosure.

Referring back to FIG. 7, in some examples, the example technique includes forming a metal oxide layer on the high temperature bond coating. FIG. 8H is a cross-sectional side view diagram illustrating the portion of the example C/C composite substrate of FIG. 8A, a bond layer 756, and an outer oxide layer 758, according to examples of the disclosure. Metal slurries 768A and 768B of FIGS. 8C and 8E may include metal particles coated by a layer of a metal oxide, such a silicon oxide, titanium oxide, and/or tungsten oxide. During heating of surface 762, at least a portion of the metal oxide from the metal particles may go into solution and migrate from the respective metal slurry 768A or 768B to a surface of the bond layer 756. Upon cooling, the metal oxide may form outer oxide layer 758 of the metal oxide on the bond layer 756. In some examples, rather than or in addition to forming outer oxide layer 758, at least a portion of the metal oxide may remain in bond layer 756, such that, during operation of a component that includes substrate 752, the metal oxide may be available to migrate to one or more cracks formed in bond layer 756.

Figure 8I:
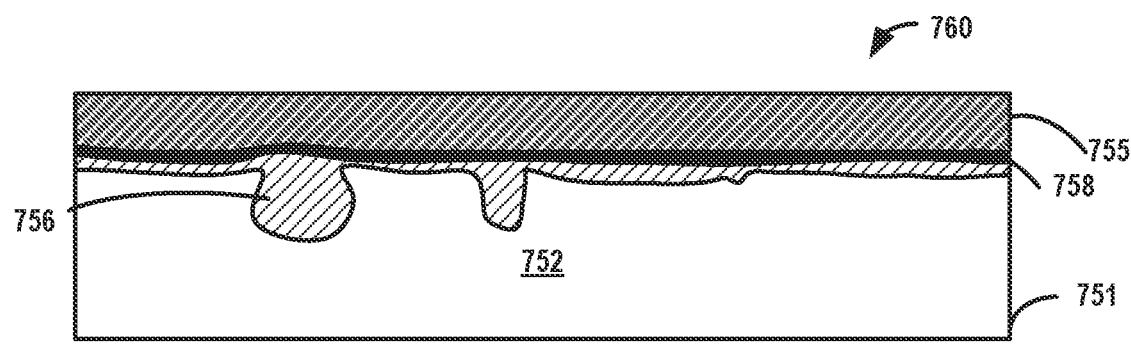
FIG. 8I is a cross-sectional side view diagram illustrating the portion of the example carbon composite substrate of FIG. 8A, a bond layer, an outer oxide layer, and braze material, according to examples of the disclosure.

Referring back to FIG. 7, the example technique includes joining a second component to a first component by brazing with a braze material (678). FIG. 8I is a cross-sectional side view illustrating portion 760 of the example C/C composite of FIG. 8A, and braze material 755 according to the present disclosure. Although braze material 755 is illustrated as covering and encapsulating outer layer 758, in some examples, such as where bond layer 756 is metal-lean and therefore does not include available metal to react with an oxide, braze material 755 may be applied directly on bond layer 756, and outer oxide layer 758 may be omitted. In some examples, joining a second component to a first component by brazing may include applying a braze material of the present disclosure to bond layer 756. Braze material 755 may be applied by any suitable means, including but not limited to painting, taping, placing a foil or preform, spraying, sputtering, or the like. Referring to FIG. 10, metal application system 988 may also be configured to apply braze material 755 in some examples. Metal application system 988 may be configured to apply the braze material to a surface of substrate 952. While illustrated in FIG. 10 as a spray system, metal application system 988 may include any system configured to apply braze material to the surface of substrate 952, such as a brush system or sputtering system. In some examples, as mentioned above, braze material 755 may be applied to substrate 752 at a thickness of between about 0.5 mm to about 20 mm through any of the above techniques or other techniques, such as manual techniques completed by an operator.

Figure 8J:
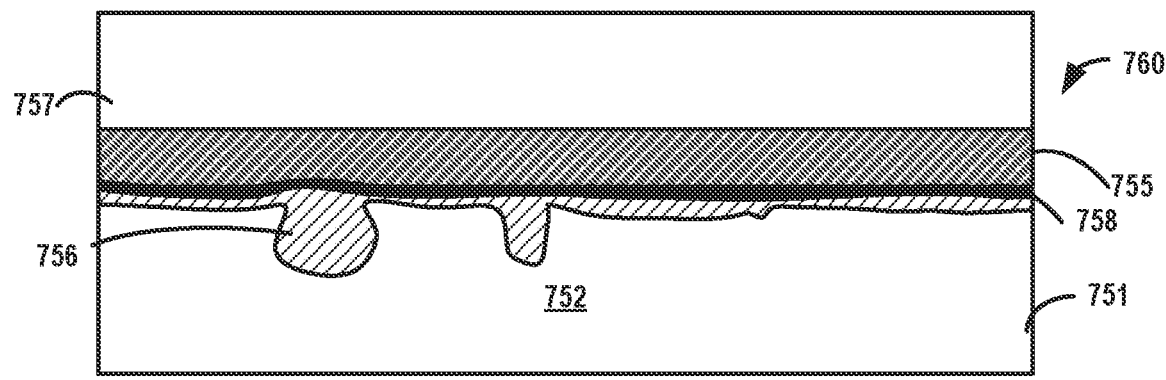
FIG. 8J is a cross-sectional side view diagram illustrating the portion of the example carbon composite substrate of FIG. 8A, a bond layer, an outer oxide layer, braze material, and a second component joined to the carbon composite substrate, according to examples of the disclosure.

FIG. 8J is a cross-sectional side view illustrating portion 760 of the example C/C composite of FIG. 8A, and braze material 755 joining second component 757 to first component 751, according to the present disclosure. In some examples joining second component to the first component may include heating braze material 755 to at least soften the braze material. Referring to FIG. 10, system 980 may include a furnace 990 configured to enclose first component 951 and the second component (not illustrated in FIG. 10) as the braze material is at least softened to join the components. In some instances, furnace 990 may include a graphite retort, which the components may be placed inside during the heating step of the brazing process. In some examples, the heating step may be carried out in an inert atmosphere inside furnace 990. Alternatively, the heating step of the brazing process may be conducted in the presence of carbon monoxide. Heating the braze material, in some instances, may comprise heating the braze material to at least 1000° C., such as about 1500° C. In some examples, the heating step of the brazing process may include heating braze material 755 (FIG. 8J), disposed between first component 751 and second component 757, in furnace 990 (FIG. 10) for a length of time between about 1 minute and about 20 minutes.

In some examples, joining a second component to a first component by brazing with a braze material may include cooling braze material 755 disposed between first component 751 and second component 757. In some examples, the cooling step of the brazing process may include merely removing the article which includes the joined components 751, 757 from a furnace (990, FIG. 10). However, in some examples, cooling may include cooling at a controlled rate. For example, furnace 990 may be turned off or turned down, and braze material 755 may cool and cure to join components 751, 757. In some examples, the controlled rate of cooling may be between about 1° C./minute and about 300° C./minute, such as between about 5° C./minute and about 100° C./minute.

Figure 9:
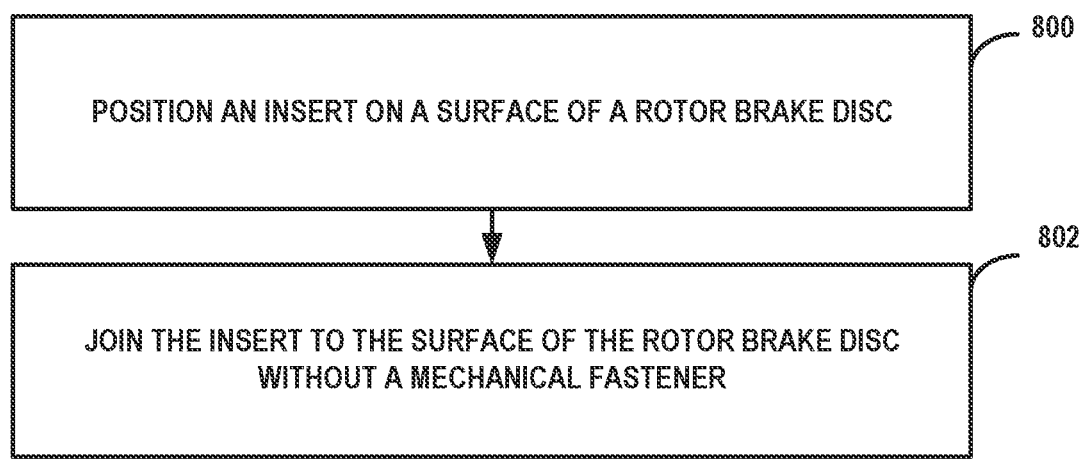
FIG. 9 is a flow diagram illustrating an example technique for manufacturing a rotor brake disc, according to examples of the disclosure.

FIG. 9 is a flowchart illustrating an example technique for manufacturing a brake assembly. Although described primarily with respect to rotor brake disc 336 (FIGS. 3 and 4) of brake assembly 258 (FIG. 2) of wheel 110 (FIG. 1), the illustrated systems may be manufactured using other techniques, and the described techniques may be used to manufacture other brake assemblies.

With concurrent reference to FIGS. 2, 3, 4, and 8, the technique of FIG. 8 includes positioning insert 370A on surface 372 of rotor brake disc 336 (800). Surface 372 of rotor brake disc 336 interfaces with another component, drive key 340, of brake assembly 258 (FIG. 2) while brake assembly 258 is mounted on a vehicle and the vehicle is in operation.

The technique of FIG. 8 also includes joining insert 370A to surface 372 of rotor brake disc 336 without a mechanical fastener (802). Insert 370A defines a tough mechanical contact surface 373 which protects rotor 336 during operation of brake assembly 258. In some examples, joining insert 370A to surface 372 of rotor 336 may include brazing insert 370 to surface 372 of rotor brake disc 336 using braze material (455, FIG. 5). In some examples, the other component of brake assembly 258 may be rotor drive key 340. In some examples, rotor brake disc 336 may defines a substantially circular brake disc, and rotor brake disc 336 may define slot 364 which interacts with rotor drive key 340 during operation, when rotor drive key 340 may apply a tangential force to rotor brake disc 336. In some examples, insert 370A is joined to surface 372 defined by slot 364 to protect rotor brake disc 336 during interaction of rotor brake disc 336 with rotor drive key 340.

In some examples, surface 372 is a first surface, and the rotor brake disc further defines a second surface (e.g. one or more of surfaces 378, 379, or 376), and joining insert 370A to rotor brake disc 336 further includes joining insert 370A to the second surface. Referring concurrently to FIG. 5, in some examples, rotor brake disc 336 may include a carbon composite substrate 452, and the technique of FIG. 8 may further include forming high temperature coating 454 on a surface of the carbon composite substrate 452. High temperature coating 454 may include bond layer 456, which may include a metal carbide. In some examples, rotor brake disc 336 may include a carbon or carbon/carbon composite. Insert 370A may include a carbon, carbon/carbon, or monolithic ceramic substrate. Thus, in some examples, rotor 336 and insert 370A may define a substantially similar CTE. Additionally, or alternatively, insert 370A may define a monolithic ceramic substrate, and the monolithic ceramic substrate may include a rare-earth silicate or rare-earth disilicate.

Insert 370A may be joined to surface 372 of slot 364 of rotor brake disc 336 by braze material. In some examples, the braze material may include a platinum group metal. For example, rotor brake disc 336 may include a carbon/carbon composite at least partially covered by a high temperature coating (454, FIG. 5) which includes silicon carbide. Rotor brake disc 336 may be joined by braze material (455, FIG. 5) which may include platinum, and insert 370A may include ytterbium disilicate. In some examples, the technique of FIG. 8 may further include incorporating brake assembly 258 into wheel 210, which may in some examples be an aircraft wheel, a wheel of a land vehicle, or a wheel of a marine vehicle.

The following numbered examples illustrate one or more aspects of the articles and techniques described in this disclosure:

Example 1A: An article includes a first component includes a substrate comprising a carbon matrix; and a high temperature coating on a surface of the substrate, wherein the high temperature coating comprises a bond layer of a metal carbide on the surface of the substrate; a second component; and a braze material joining a surface of the high temperature coating of the first component to a surface of the second component.

Example 2A: The article of example 1A, wherein the substrate comprises a carbon substrate, carbon/carbon composite substrate, or a monolithic ceramic substrate.

Example 3A: The article of example 1A or 2A, wherein the second component comprises a carbon substrate, carbon/carbon composite substrate, or a monolithic ceramic substrate.

Example 4A: The article of any of examples 1A-3A, wherein the first component and the second component have a substantially similar CTE.

Example 5A: The article of example 3A, wherein the second component comprises a monolithic ceramic substrate, and wherein the monolithic ceramic substrate comprises a rare-earth silicate.

Example 6A: The article of any of examples 1A-5A, wherein the metal carbide comprises silicon carbide.

Example 7A: The article of any of examples 1A-6A, wherein the braze material comprises a platinum group metal.

Example 8A: The article of any of examples 1A-7A, wherein the first component comprises a carbon/carbon composite, the high temperature coating comprises silicon carbide, the braze material comprises platinum, and the second component comprises ytterbium disilicate.

Example 9A: The article of any of examples 1A-8A, wherein the high temperature article is a component of brake assembly.

Example 10A: The article of any of examples 1A-9A, wherein the second component defines a mechanical contact surface configured to protect the first component.

Example 11A: The article of any of examples 1A-10A, wherein a thickness of the bond layer is less than about 30 micrometers.

Example 12A: The article of any of examples 1A-11A, wherein a thickness of the braze material is less than about 20 millimeters.

Example 13A: A method includes forming a high temperature coating on a surface of a substrate of a first component, wherein the first component comprises a substrate comprising a carbon matrix, and wherein the high temperature coating comprises a bond layer of a metal carbide on the surface of the substrate; and joining a surface of the second component to a surface of the high temperature coating of the first component by brazing with a braze material.

Example 14A: The method of example 13A, wherein the carbon composite substrate comprises a carbon, carbon/carbon composite, or a monolithic ceramic substrate.

Example 15A: The method of example 13A or 14A, wherein the second component comprises a carbon, carbon/carbon, or monolithic ceramic substrate, and wherein the method further comprises forming a high temperature coating on a surface of the substrate of the second component.

Example 16A: The method of any of examples 13A-15A, wherein the first component and the second component have a substantially similar CTE.

Example 17A: The method of any of examples 13A-16A, wherein the second component comprises a monolithic ceramic substrate, and the monolithic ceramic substrate comprises a rare-earth silicate or rare-earth disilicate.

Example 18A: The method of any of examples 13A-17A, wherein the metal carbide comprises silicon carbide.

Example 19A: The method of any of examples 13A-18A, wherein the braze material comprises a platinum group metal.

Example 20A: The method of any of examples 13A-19A, wherein the first component comprises a carbon/carbon composite, the high temperature coating comprises silicon carbide, the braze material comprises platinum, and the second component comprises ytterbium disilicate.

Example 21A: The method of any of examples 13A-20A, wherein the high temperature article is a component of a wheel or brake.

Example 22A: The method of any of examples 13A-22A, wherein the second component defines a tough mechanical contact surface configured to protect the first component.

Example 23A: The method of any of examples 13A-22A, wherein a thickness of the bond layer is less than about 30 micrometers.

Example 24A: The method of any of examples 13A-23A, wherein a thickness of the braze material is less than about 20 millimeters.

Example 25A: The method of any of examples 13A-24A, wherein forming the high temperature component on the substrate comprises: applying carbon powder to a surface of a carbon/carbon (C/C) composite substrate to force the carbon powder into one or more surface voids of the surface of the C/C composite substrate, wherein the carbon powder has a substantially same composition and morphology as a surface portion of the C/C composite substrate; applying a metal slurry to the surface of the C/C composite substrate following the application of the carbon powder; and reacting a metal of the metal slurry with carbon of the carbon powder and carbon of the surface portion of the C/C composite substrate to form a layer of a metal carbide on the C/C composite substrate.

Example 26A: The method of any of examples 13A-25A, wherein joining the first component to the second component by brazing comprises applying the braze material to the surface of the first component and heating the braze material to at least soften the braze material.

Example 27A: The method of example 26A, wherein heating the braze material comprises heating the braze material in an inert atmosphere.

Example 28A: The method of example 26A, wherein heating the braze material comprises heating the braze material in the presence of carbon monoxide.

Example 29A: The method of example 26A, wherein applying the braze material comprises brushing, spraying, or sputtering the braze material.

Example 30A: The method of example 26A, wherein heating the braze material comprises heating the braze material to a temperature of at least about 1000 degrees Celsius.

Example 1B: A brake assembly includes a rotor having a surface configured to interface with another component of the brake assembly; and an insert joined to the surface of the rotor without a mechanical fastener, wherein the insert defines a tough mechanical contact surface configured to protect the rotor.

Example 2B: The brake assembly of example 1B, further comprising braze material joining the insert to the surface of the rotor.

Example 3B: The brake assembly of example 1B or example 2B, wherein the other component of the brake assembly is a rotor drive key, wherein the rotor defines a substantially circular brake disc, the rotor defines a slot configured to interact with the rotor drive key, and wherein the insert is joined to a surface defined by the slot.

Example 4B: The brake assembly of any of examples 1B-3B, wherein the surface of the rotor is a first surface, and the rotor further defines a second surface, and the insert is joined to the second surface.

Example 5B: The brake assembly of any of examples 1B-4B, wherein the rotor comprises a carbon composite substrate, and wherein the rotor comprises a high temperature coating on a surface of the carbon composite substrate, wherein the high temperature coating comprises a bond layer of a metal carbide on the surface of the substrate.

Example 6B: The brake assembly of example 5B, wherein the carbon composite substrate comprises a carbon, carbon/carbon composite, or a monolithic ceramic substrate.

Example 7B: The brake assembly of example 5B or example 6B, wherein the insert comprises a carbon substrate, and wherein the carbon composite substrate comprises a carbon, carbon/carbon, or monolithic ceramic substrate.

Example 8B: The brake assembly of any of examples 1B-7B, wherein the rotor and the insert component have a substantially similar CTE.

Example 9B: The brake assembly of example 7B, comprises a monolithic ceramic substrate, and the monolithic ceramic substrate comprises a rare-earth silicate or rare-earth disilicate.

Example 10B: The brake assembly of any of examples 1B-9B, wherein the metal carbide comprises silicon carbide.

Example 11B: The brake assembly of any of examples 1B-10B, wherein the braze material comprises a platinum group metal.

Example 12B: The brake assembly of any of examples 1B-11B, wherein the rotor comprises a carbon/carbon composite, the high temperature coating comprises silicon carbide, the braze material comprises platinum, and the insert comprises ytterbium disilicate.

Example 13B: The brake assembly of any of examples 1B-12B, wherein the brake assembly is a component of an aircraft wheel.

Example 14B: The brake assembly of any of examples 1B-13B, wherein the insert defines a tough mechanical contact surface configured to protect the rotor.

Example 15B: The brake assembly of example 5B, wherein a thickness of the bond layer is less than about 30 micrometers.

Example 16B: The brake assembly of any of examples 1B-15B, wherein a thickness of the braze material is less than about 20 millimeters.

Example 17B: A method of manufacturing a brake assembly includes positioning an insert on a surface of a rotor, wherein the surface of the rotor interfaces with another component of the brake assembly; and joining the insert to the surface of the rotor without a mechanical fastener, wherein the insert defines a tough mechanical contact surface configured to protect the rotor during operation of the brake assembly.

Example 18B: The method of example 17B, wherein joining the insert to the surface of the rotor comprises brazing the insert to the surface of the rotor using braze material.

Example 19B: The method of example 17B or 18B, wherein the other component of the brake assembly is a rotor drive key, wherein the rotor defines a substantially circular brake disc, the rotor defines a slot configured to interact with the rotor drive key, and wherein the insert is joined to a surface defined by the slot to protect the rotor during interaction of the rotor with the rotor drive key.

Example 20B: The method of any of examples 17B-19B, wherein the surface of the rotor is a first surface, and the rotor further defines a second surface, and joining the insert to the surface further comprises joining the insert to the second surface.

Example 21B: The method of any of examples 17B-20B, wherein the rotor comprises a carbon composite substrate, and wherein the method further comprises forming a high temperature coating on a surface of the carbon composite substrate, wherein the high temperature coating comprises a bond layer of a metal carbide on the surface of the substrate.

Example 22B: The method of example 21B, wherein the carbon composite substrate comprises a carbon, carbon/carbon composite, or a monolithic ceramic substrate.

Example 23B: The method of example 21B or 22B, wherein the insert comprises and carbon substrate, and wherein the carbon composite substrate comprises a carbon, carbon/carbon, or monolithic ceramic substrate.

Example 24B: The method of any of example 17B-23B, wherein the rotor and the insert component have a substantially similar CTE.

Example 25B: The method of any of example 17B-24B, comprises a monolithic ceramic substrate, and the monolithic ceramic substrate comprises a rare-earth silicate or rare-earth disilicate.

Example 26B: The method of example 21B, wherein the metal carbide comprises silicon carbide.

Example 27B: The method of example 21B, wherein the braze material comprises a platinum group metal.

Example 28B: The method of any of examples 17B-27B, wherein the rotor comprises a carbon/carbon composite, the high temperature coating comprises silicon carbide, the braze material comprises platinum, and the insert comprises ytterbium di silicate.

Example 29B: The method of any of examples 17B-28B, further comprising incorporating the brake assembly into an aircraft wheel.

What is claimed is:

1. A brake assembly comprising:
    a rotor having a surface configured to interface with another component of the brake assembly, wherein the rotor comprises:
        a carbon composite substrate, and
        a high temperature coating comprising a bond layer of a metal carbide on a surface of the carbon composite substrate; and
    an insert joined to the surface of the rotor without a mechanical fastener, wherein:
        the insert defines a tough mechanical contact surface configured to protect the rotor, and
        the insert comprises a monolithic ceramic substrate which includes a rare-earth silicate or rare-earth disilicate.

2. The brake assembly of claim 1, further comprising braze material joining the insert to the surface of the rotor.

3. The brake assembly of claim 1, wherein the other component of the brake assembly is a rotor drive key,
    wherein the rotor defines a substantially circular brake disc, the rotor defines a slot configured to interact with the rotor drive key, and
    wherein the insert is joined to a surface defined by the slot.

4. The brake assembly of claim 1, wherein the surface of the rotor is a first surface, and the rotor further defines a second surface, and the insert is joined to the second surface.

5. The brake assembly of claim 1, wherein the rotor and the insert component have a substantially similar CTE.

6. The brake assembly of claim 1, wherein the metal carbide comprises silicon carbide.

7. The brake assembly of claim 1, further comprising a braze material, wherein the braze material comprises a platinum group metal.

8. The brake assembly of claim 7, wherein the rotor comprises a carbon/carbon composite, the high temperature coating comprises silicon carbide, the braze material comprises platinum, and the insert comprises ytterbium disilicate.

9. The brake assembly of claim 1, wherein the brake assembly is a component of an aircraft wheel.

10. The brake assembly of claim 1, wherein a thickness of the bond layer is less than about 30 micrometers.

11. The brake assembly of claim 7, wherein a thickness of the braze material is less than about 20 millimeters.

12. A method of manufacturing a brake assembly, the method comprising:
    positioning an insert on a surface of a rotor, wherein the rotor comprises a carbon composite substrate and a high temperature coating comprising a bond layer of a metal carbide on the surface of the carbon composite substrate, wherein the surface of the rotor interfaces with another component of the brake assembly; and
    joining the insert to the surface of the rotor without a mechanical fastener, wherein the insert defines a tough mechanical contact surface configured to protect the rotor during operation of the brake assembly, and wherein the insert comprises a monolithic ceramic substrate which includes a rare-earth silicate or rare-earth disilicate.

13. The method of claim 12, wherein joining the insert to the surface of the rotor comprises brazing the insert to the surface of the rotor using braze material.

14. The method of claim 12, wherein the other component of the brake assembly is a rotor drive key, wherein the rotor defines a substantially circular brake disc, the rotor defines a slot configured to interact with the rotor drive key, and wherein the insert is joined to a surface defined by the slot to protect the rotor during interaction of the rotor with the rotor drive key.

15. The method of claim 12, wherein the surface of the rotor is a first surface, and the rotor further defines a second surface, and the insert is joined to the second surface.

\* \* \* \* \*